July 5, 1960

J. P. ECKERT, JR 2,944,161

MAGNETIC COUNTER CIRCUITS

Filed Aug. 6, 1954

INVENTOR

JOHN PRESPER ECKERT, JR.

BY

ATTORNEY

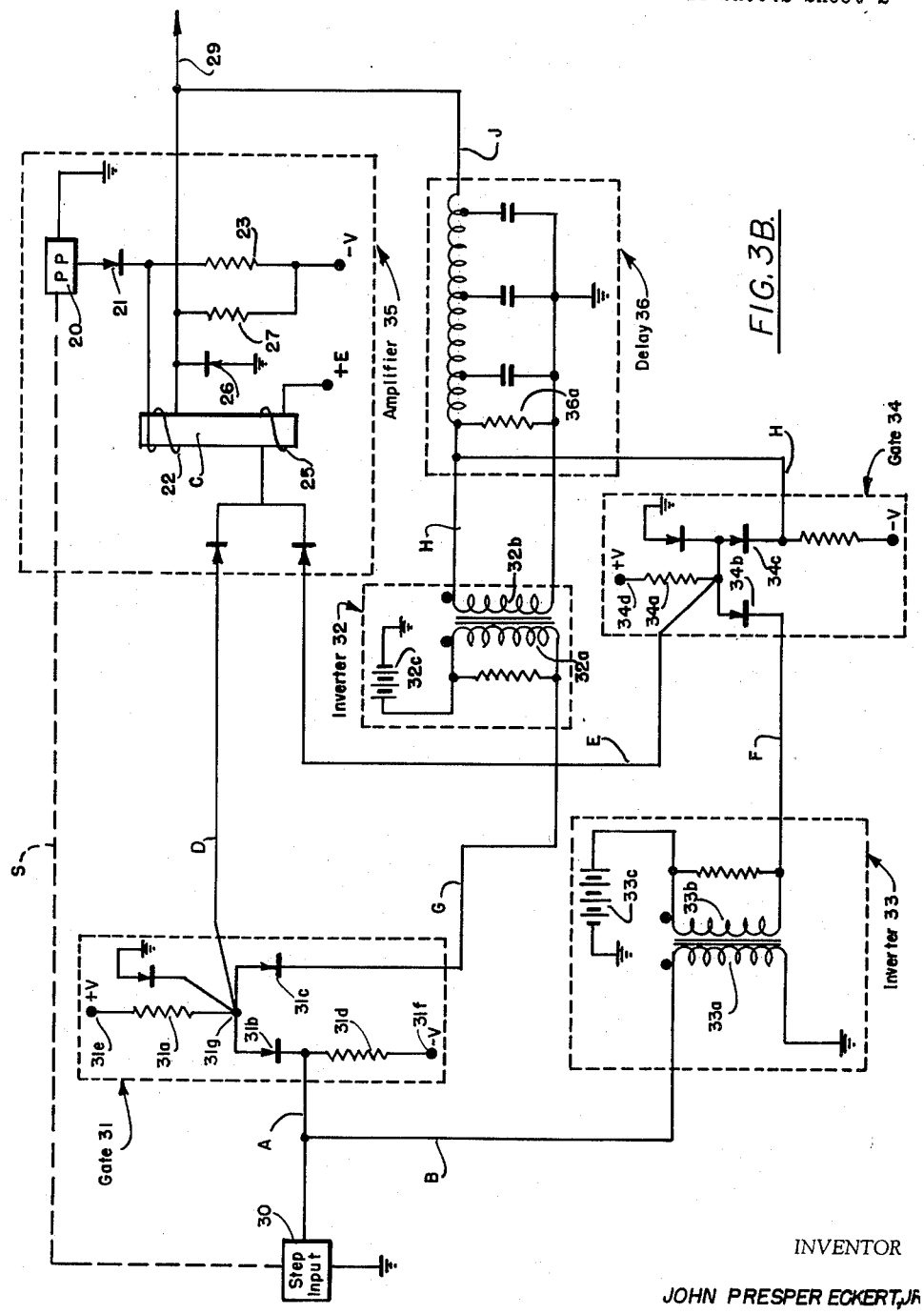

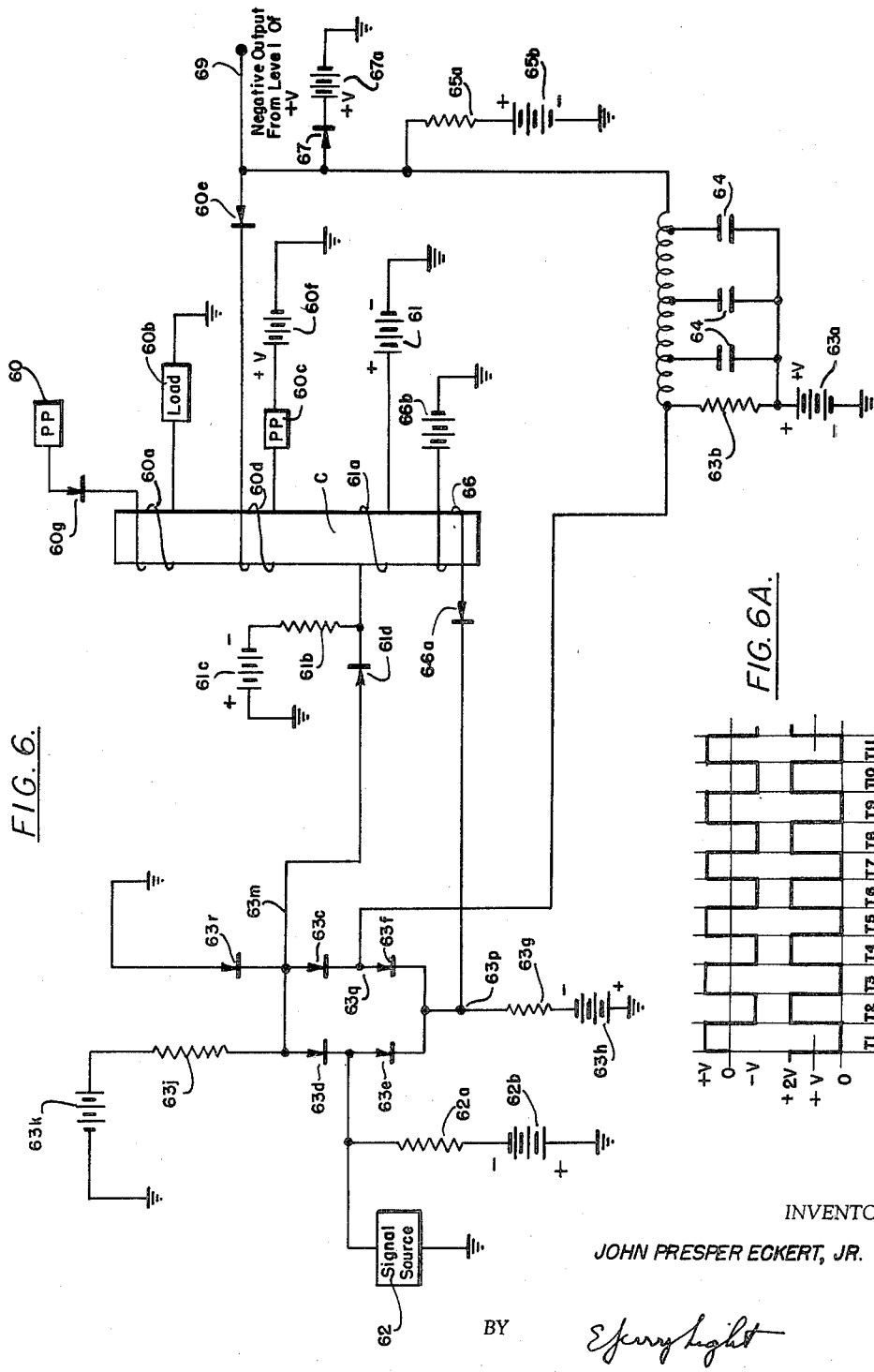

July 5, 1960

J. P. ECKERT, JR 2,944,161

MAGNETIC COUNTER CIRCUITS

Filed Aug. 6, 1954

INVENTOR
JOHN PRESPER ECKERT, JR.

BY

ATTORNEY

July 5, 1960 — J. P. ECKERT, JR — 2,944,161
MAGNETIC COUNTER CIRCUITS
Filed Aug. 6, 1954 — 11 Sheets-Sheet 6

INVENTOR
JOHN PRESPER ECKERT, JR.
BY
ATTORNEY

July 5, 1960

J. P. ECKERT, JR 2,944,161

MAGNETIC COUNTER CIRCUITS

Filed Aug. 6, 1954

INVENTOR
JOHN PRESPER ECKERT, JR.

BY

ATTORNEY

July 5, 1960 J. P. ECKERT, JR 2,944,161
MAGNETIC COUNTER CIRCUITS
Filed Aug. 6, 1954

INVENTOR

JOHN PRESPER ECKERT, JR.

BY *Epnyhight*

ATTORNEY

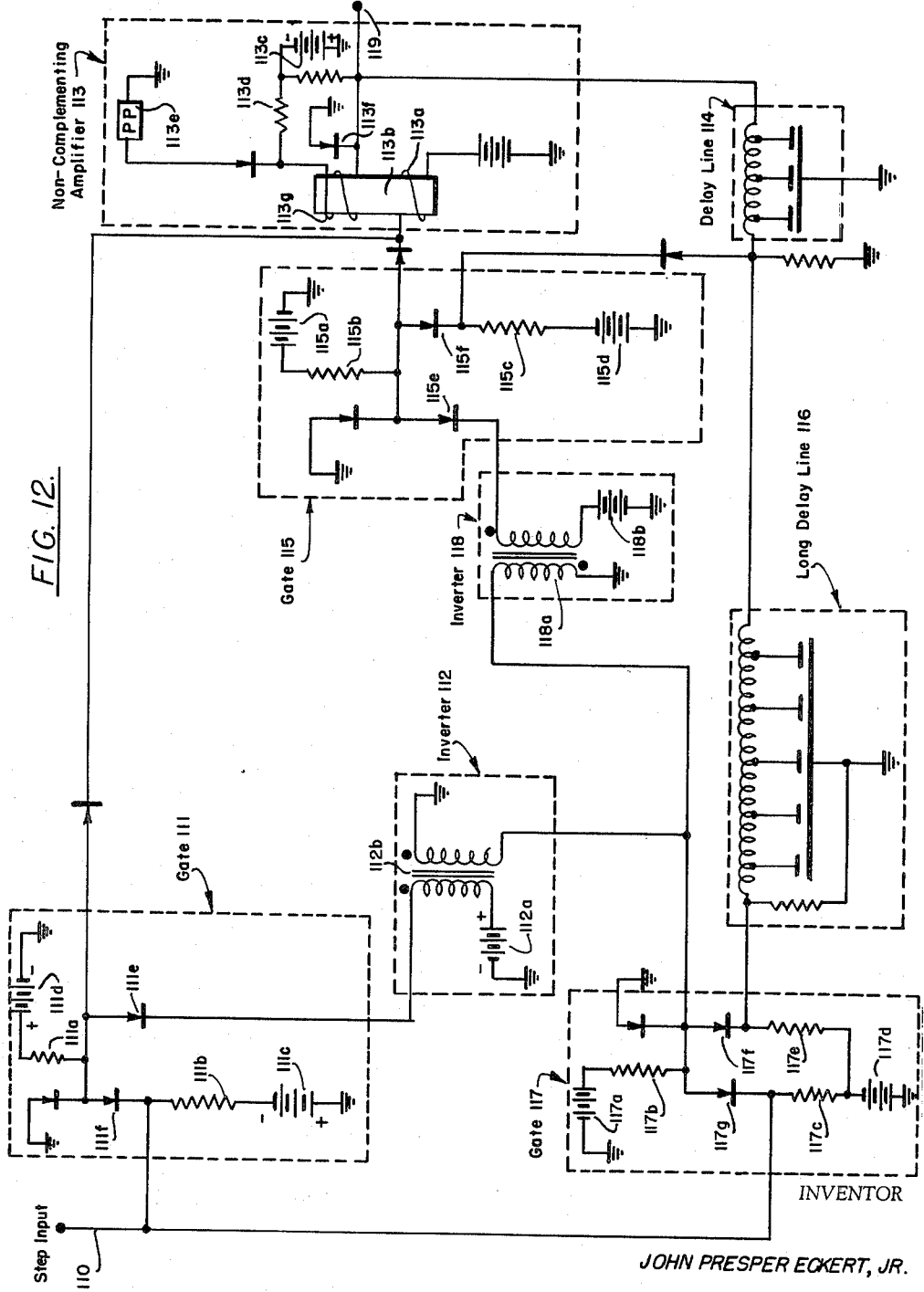

July 5, 1960
J. P. ECKERT, JR
2,944,161
MAGNETIC COUNTER CIRCUITS
Filed Aug. 6, 1954
11 Sheets-Sheet 10
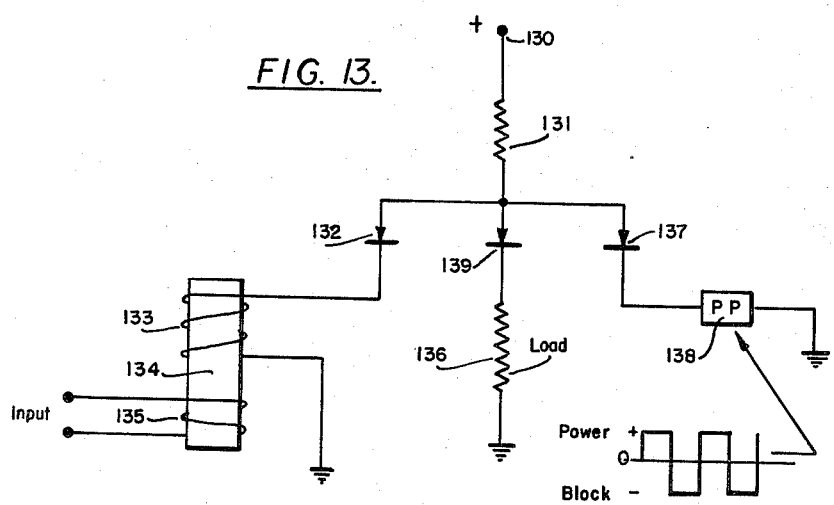
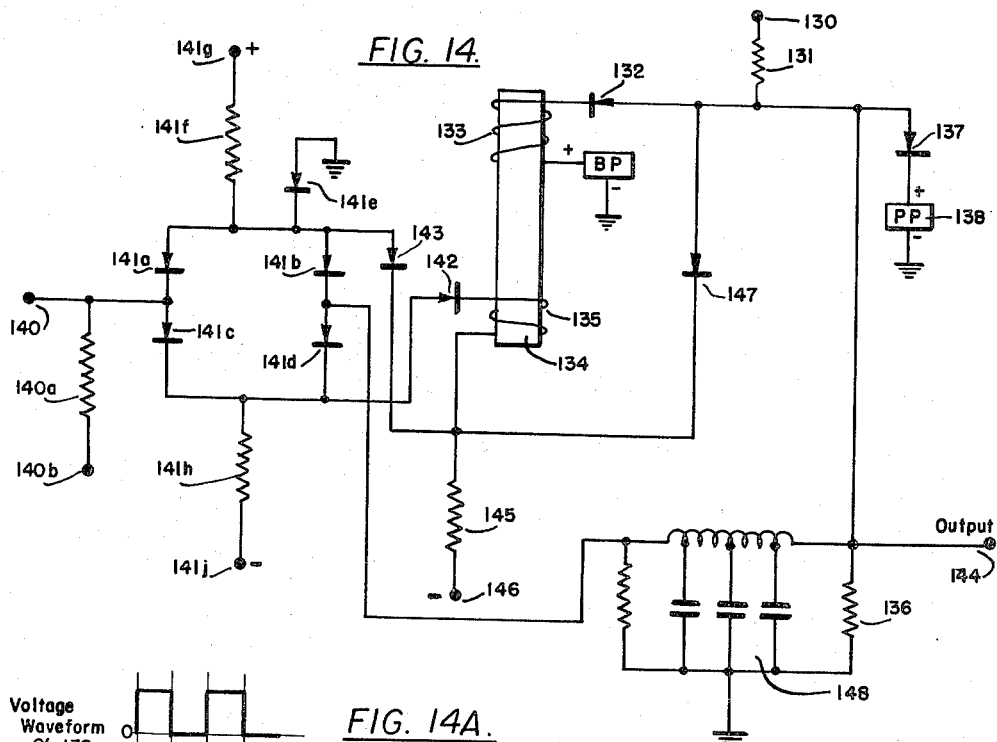
INVENTOR
JOHN PRESPER ECKERT, JR.
BY
ATTORNEY

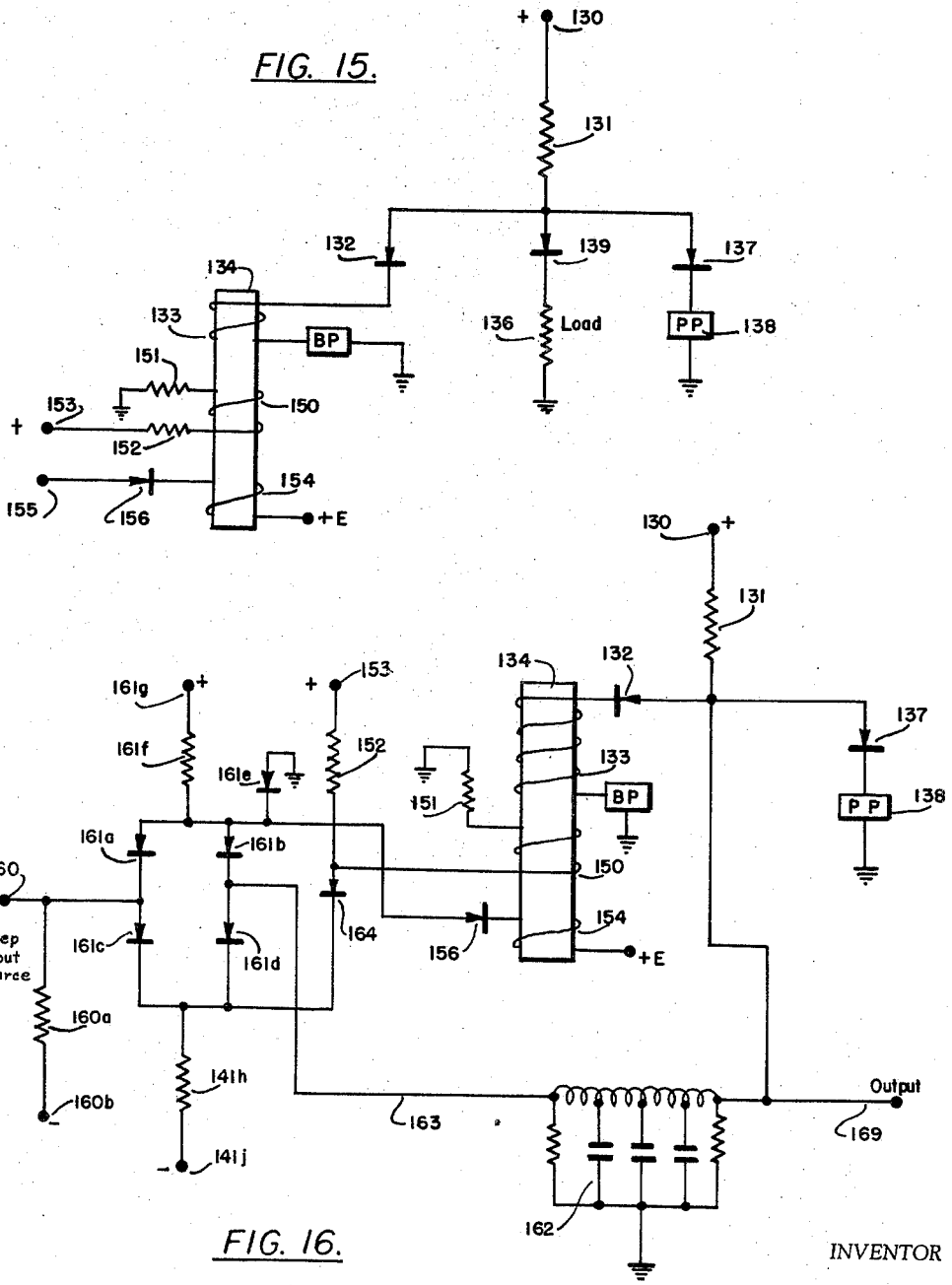

United States Patent Office 2,944,161
Patented July 5, 1960

2,944,161
MAGNETIC COUNTER CIRCUITS

John Presper Eckert, Jr., Philadelphia, Pa., assignor, by mesne assignments, to Sperry Rand Corporation, New York, N.Y., a corporation of Delaware Filed Aug. 6, 1954, Ser. No. 448,206

31 Claims. (Cl. 307—88)

This invention relates to counter circuits and more particularly to counter circuits of the type used in electronic computers.

The primary object of this invention is to provide a counter circuit utilizing magnetic amplifiers whereby the advantage of that type of component is achieved.

Another object of this invention is to provide a counter circuit in which the component parts are not as likely to burn out as in the circuits of the prior art.

An additional object of this invention is to provide a magnetic counter circuit that is low in cost.

Still another object of this invention is to provide a counter circuit that may be placed in a very small space.

In addition, it is an object of the invention to provide a counter circuit that is very efficient and effective in operation.

Briefly speaking, the invention employs the combination of a magnetic amplifier and means whereby the amplifier acts as a flip-flop circuit, and one or more gates, all so combined as to produce a counter circuit in which there is one output signal for every two input signals. Various modifications in the circuit for combining the aforesaid elements are hereinafter described.

In the drawings:

Figure 3B is a schematic diagram of the combination of Figure 3.

Figure 6 is a schematic diagram of yet another form of this invention.

Figure 6A is a waveform diagram of the power pulses of Figure 6.

Figure 12 is a schematic diagram of the device of Figure 11.

Figure 13 is a schematic diagram of a non-complementing parallel type magnetic amplifier.

Figure 14 is a schematic diagram of a magnetic counter circuit employing a non-complementing parallel type magnetic amplifier.

Figure 14A is a waveform diagram showing the relative waveforms of the pulse generators of Figure 14.

Figure 15 is a schematic diagram of a complementing parallel type magnetic amplifier.

Figure 16 is a schematic diagram of a magnetic counter circuit employing the amplifier of Figure 15.

The present application utilizes magnetic amplifiers of the general types described in the following two applications. Theodore H. Bonn and Robert D. Torrey, Serial No. 402,858, filed January 8, 1954, entitled, "Signal Translating Device"; and John Presper Eckert, Jr. and Theodore H. Bonn, Serial No. 382,180, filed September 24, 1953, entitled "Signal Translating Device." These applications are assigned to the assignee of the present application.

Figure 2:
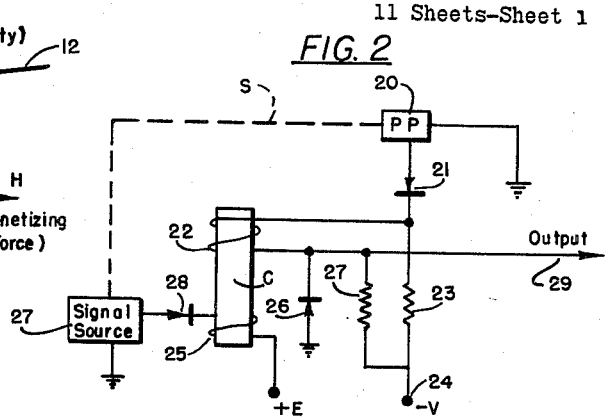
Figure 2 is a schematic diagram of a non-complementing amplifier of a type which may be employed in connection with the invention.

Generally speaking, there are four types of magnetic amplifiers which may be employed in connection with this invention, as follows:

(1) Non-complementing series amplifiers of which Figure 2 is a typical illustration. Figures 3, 3B, 4, 5, 6, 7, 8, 11, 11A and 12, illustrate magnetic counter circuits employing non-complementing series amplifiers.

Figure 9:
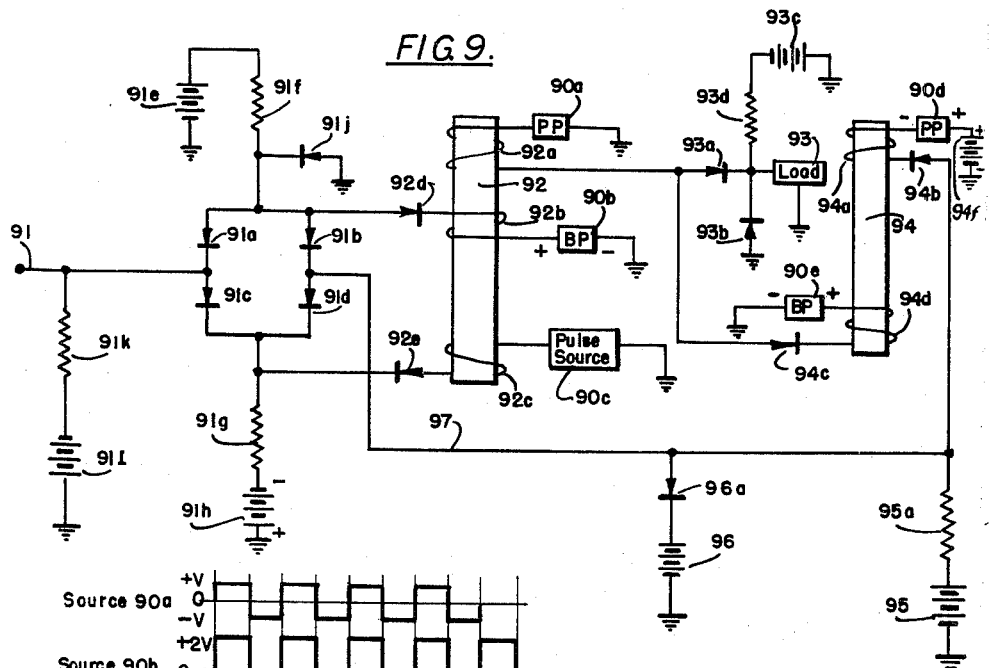
Figure 9 is a schematic diagram of another modified form of the invention using complementing magnetic amplifiers.

(2) Complementing series amplifiers. An amplifier of this type is one in which an uninterrupted train of power pulses normally flows through a winding on the core to the load but which is interrupted by an input pulse occurring between pulses of the series. A magnetic counter circuit using such an amplifier is shown in Figure 9.

Figure 10:
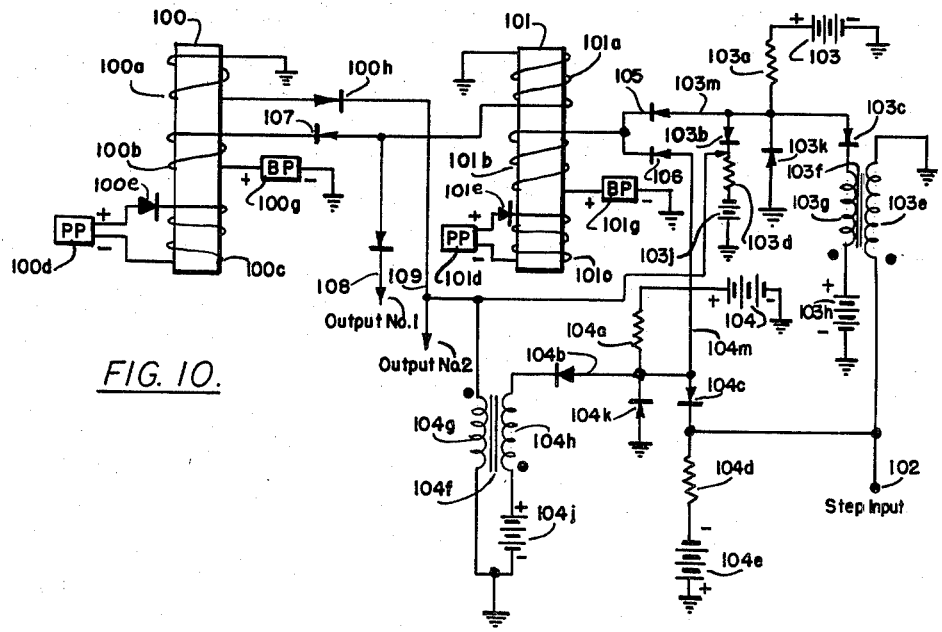
Figure 10 is a schematic diagram of still another modified form of the invention in which transformer action is employed.

(3) A non-complementing parallel amplifier of the type shown in Figures 10 and 13. A magnetic counter circuit employing this type of magnetic amplifier is illustrated in Figures 10 and 14.

(4) A complementing parallel type amplifier, as shown in Figure 15. A magnetic counter circuit employing this type of magnetic amplifier is shown in Figure 16.

Figure 1:
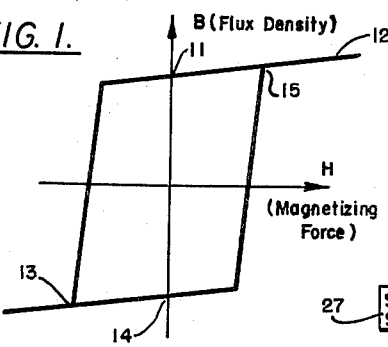
Figure 1 is an idealized hysteresis loop of the material used in the cores of the magnetic amplifiers.

Figure 1 illustrates the hysteresis loop for the bistable state core C of the magnetic amplifier of Figure 2. The core may be made of a variety of materials, among which are the various types of ferrites and the various magnetic tapes, including Orthonik and 4–79 Molypermalloy. These materials may have different heat treatments to give them different properties. The magnetic material employed in the core should preferably, though not necessarily, have a substantially rectangular hysteresis loop (as shown in Figure 1). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high.

A typical non-complementing amplifier of the type that may be employed in connection with the invention is illustrated in Figure 2 and employs a source 20 producing an uninterrupted train of power pulses which are equally spaced, and generally the spaces between the pulses are equal to the duration of the pulses. The pulses produced by source 20 in combination with rectifier 21 are similar to those shown on the top horizontal line of Figure 3A. Rectifier 21 is used when source 20 is an alternating current source, whereby only positive halves of the cycle appear, as shown, in said top line of said Figure 3A. The signal source 27 produces from time to time the control signals and by reason of any suitable means S, these control signals are always synchronized to appear during spaces between the power pulses. When the power pulses from source 20 are positive they pass through rectifier 21, coil 22, resistor 27 to negative pole 24 which is below ground potential. If we assume that at the start of the first pulse the core was residing at a stable state represented by point 14 on its hysteresis loop (see Figure 1), it will be driven to point 15. At the end of this pulse, it will return to and reside in a second stable state represented by zero value 11. At the conclusion of the first pulse, current will flow in the following circuit: from ground to rectifier 26, coil 22, resistor 23 to negative pole 24. This is a current flow through coil 22 in the opposite direction from that of the first pulse and drives the core negatively from point 11 to point 13. At the conclusion of this reverse pulse, the second power pulse will again drive the core positively from point 13 through point 14 to point 15, and from thence it will go to 11, after the conclusion of the second pulse. The next action will be another flow of current in the following circuit: from ground, rectifier 26, coil 22, resistor 23, to negative pole 24.

Hence, the magnetization of the core will repeatedly traverse the hysteresis loop and the majority of the time the core will be operating on unsaturated portions of the hysteresis loop, consequently there will be substantially no output. If, however, an input signal is received in coil 25, at a time when the core is at point 11, the reverse current (in circuit: ground 26–22–23–24) will not drive the core negatively to point 13 as usual. In such situation, there will be two opposite magnetizing forces on the core. On the one hand, there will be a flow of current in the circuit: ground to rectifier 26, coil 22, resistor 23, to negative pole 24, tending to apply a negative magnetizing force to the core. There will be an additional input current in coil 25 tending to apply a positive magnetizing force to the core. These two magnetizing forces will cancel each other and the core will remain at point 11 on the hysteresis loop. Consequently, the next power pulse will pass through rectifier 21 and coil 22 to the output. It will drive the core from point 11 to point 12 on the hysteresis loop. The core is substantially saturated throughout this entire period, and therefore a large pulse output will appear. The operation of the non-complementing amplifier may be summarized by stating that the currents will drive the core around the hysteresis loop without substantial saturation and therefore without any substantial pulse output until there is a current flow through coil 25. This will stop the alternating magnetizations of the core, allowing the next power pulse to saturate the core and give a large output.

Figure 3:
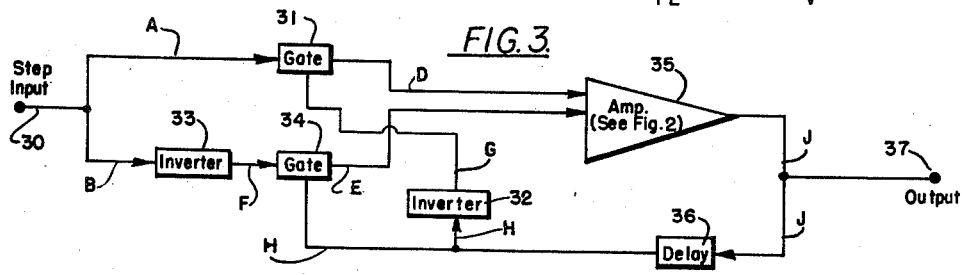
Figure 3 is a block diagram of one form of the invention.

Figure 3 is a block diagram of a counter circuit embodying the invention. The step input (or trigger pulse source 30 supplies pulses from time to time, which are to be counted. Gate 31 allows a signal to flow from the step input 30 to the amplifier 35 whenever it receives a signal from inverter 32 concurrently with the step input signal. Both inverters 32 and 33 are so constructed and arranged, as hereinafter described in more detail, that they have a high signal level at their respective outputs whenever there is no signal pulse at their respective inputs, and similarly there are low level signals at their respective outputs when there are pulse signals at their respective inputs. Gate 34 allows any signal from the inverter 33 to pass to the amplifier 35 if there is a control signal applied to the gate 34 by the delay line 36, provided the signal from the delay line 36 arrives concurrently with the signal from the inverter 33. The amplifier 35 includes working parts of the apparatus shown in Figure 2 except for the signal source 27.

Figure 3A:
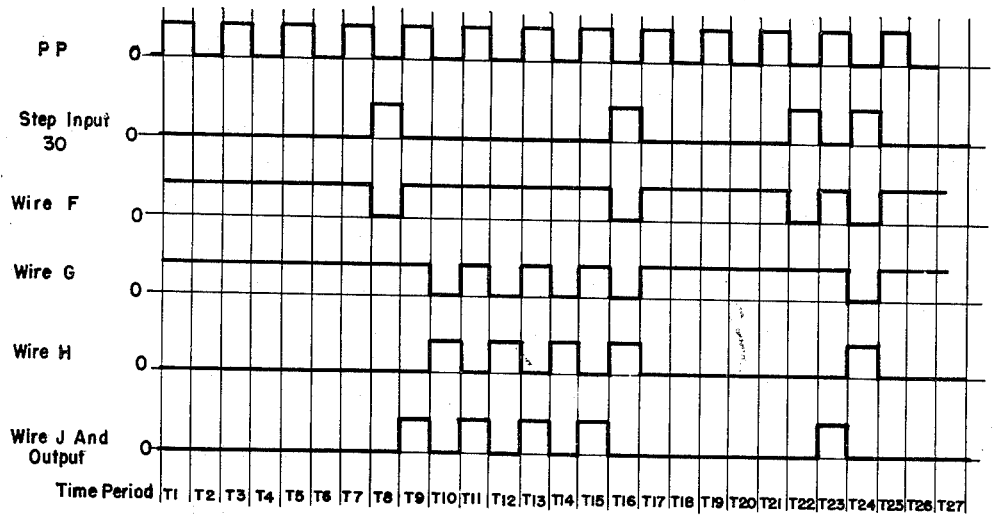
Figure 3A is a waveform diagram of the device of Figure 3.

The operation of the device of Figure 3 can be most readily understood by reference to the waveform diagram of Figure 3A where there is shown an uninterrupted train of equally spaced power pulses PP which are produced by the source 20 (Figure 2). The device of Figure 3 has two stable states, in one of which the output 37 is characterized by a plurality of equally spaced pulses. In the other stable state there is no output pulse at 37. Assuming at the start of the apparatus that there is no output pulse at terminal 37, there is consequently no signal pulse being fed into delay line 36 and hence no signal pulse at the input of inverter 32. Consequently, since the inverter has a high level output whenever there is no input pulse thereto, there will be a constant high potential on wire G, as shown in Figure 3A. On the other hand, there will be a low potential on wire H and consequently gate 34 will be closed. Assuming that there are no pulse signals at the step input, there will be no current to pass through gate 31, and since there is no input pulse to inverter 33 there will be a constant positive output potential therefrom as shown in Figure 3A.

If we assume that this situation continues for seven equally spaced time periods T1 to T7 inclusive (Figure 3A), the potentials applicable to those seven time periods will be as shown in Figure 3A. If it be assumed that at time period T8 the first input pulse appears at wire 30, it will pass through gate 31 since there is a positive potential on wire G, and will produce an output from amplifier 35 at time period T9. The reason that the output of amplifier 35 is delayed one space from its input is obvious from a study of the description of Figure 2 which has already been given. The output pulse on wire J at time T9 is delayed by delay line 36 for one time period and therefore appears at time T10 as a pulse on wire H. The potential on wire H opens gate 34 to the potential at the output of inverter 33, which rose to a positive value at the termination of time period T8 and remained positive until the next pulse on input 30. Hence, at time period T10 the positive output of inverter 33 passes through gate 34 to the input of amplifier 35 which causes a power pulse to appear at wire J at time T11. The latter pulse is delayed for one time period and therefore appears at wire H at time period T12. This potential on wire H again opens gate 34 and allows current from inverter 33 to flow to amplifier 35 at time period T12, thereby creating another pulse in the output of amplifier 35 at time period T13 which is delayed by delay means 36 and appears on wire H at time period T14. This potential on wire H again opens gate 34 and inverter 33 thereupon feeds another pulse to the input of amplifier 35 at time period T14, thereby producing another pulse at output J at time period T15 which is delayed by delay means 36 and appears at wire H at time period T16. At time period T16 there appears another pulse at step input 30 which is inverted by inverter 33 and therefore there is no output from that inverter. Consequently, at time period T16 no current can flow through either of gates 31 or 34. Current cannot flow through gate 31 because the potential at the output of inverter 32 on wire G is zero. Current cannot pass through gate 34, for although this gate is opened by reason of potential on wire H, there is no potential on wire F and therefore nothing to pass through the gate to the amplifier 35. Consequently, the input of amplifier 35 is not energized at time period T16 and consequently no output appears therefrom at time period T17. Hence, the potential on wire H drops to zero and gate 34 is closed, thus preventing any further potential from the inverter 33 from passing to the amplifier 35. The gate 31 is opened by reason of potential on wire G but since there is no step input pulse on wire A there is no current flow to the amplifier 35. This situation continues to exist as long as there is no further step input pulse, in other words it continues from time period T17 through time period T21. At time period T22 another pulse appears on step input 30 which can now pass through gate 31 which is opened by reason of the potential on wire G and flows to amplifier 35. Hence, there is an output pulse on wire J at time period T23 which is delayed and appears on wire H at time period T24. By reason of inverter 32, however, the gate 31 is closed at time period T24. Hence, although there is another step input pulse on input 30 at time T24, no current can flow through the gate 31 by reason of the absence of potential on wire G. Likewise, no potential will pass through gate 34 since the presence of the signal at time T24 on the input of inverter 33 reduced the potential of its output to zero. Hence, starting with time period T25 and ending with the next input pulse, there are no output pulses on wire 37.

The result of Figure 3A may be analyzed by stating that the input pulse at time period T8 caused the device to shift into one stable state of operation in which it produced an output pulse corresponding to each power pulse. In other words, at time periods T9, T11, T13 and T15, there were pulses in the output. These pulses would have continued indefinitely in the absence of another pulse at the step input 30. The second pulse on step input 30 stopped the appearance of pulses in the output and they remained stopped until the third input pulse at step input 30 again started the appearance of output pulses at wire J. The fourth step input pulse again stopped the appearance of power pulses. Hence, there will be an uninterrupted train of power pulses in the output between the first and second, the third and fourth, the fifth and sixth, etc. input pulses, and there will be no pulses in the output during the periods between the second and third, fourth and fifth, sixth and seventh, etc. step input pulses. If, therefore, an uninterrupted train of power pulses is considered as a group and regarded as a single output indication, there will be one output for every two input pulses.

Figure 3B is a schematic diagram of the apparatus of Figure 3. The wires A, B, D, E, F, G, H and J of Figure 3 correspond to the wires bearing similar letters in Figure 3B. In Figure 3B if we assume the state of affairs shown in Figure 3A to persist from time period T1 to T7, the several parts of Figure 3B will be operating as follows over that time period. It is assumed that the pulses from step input 30 are positive and that the lower end of resistor 31d is connected to a source of negative potential far below ground. Likewise the upper end of resistor 31a is connected to a source of positive potential far above ground. In the absence of a signal on wire A, current will flow from the positive pole 31e to the negative pole 31f and the connection 31g as well as wire D, will stand at substantially ground potential. In the event of a positive pulse appearing on wire A, the upper end of resistor 31d will become positive and rectifier 31b will be cut off whereby the wire D will conduct current from the source 31e, unless the potential induced in the secondary 32a of the inverter transformer compensates the bias battery potential 32c. In that case, the cathode of rectifier 31c is effectively grounded whereby wire D is effectively grounded and there will be no current in that wire. In other words, the only condition whereby there is an output in wire D is that there is no potential induced in the secondary 32a of the inverter transformer whereby the battery 32c raises the potential at the cathode of rectifier 31c and cuts off this rectifier; and further that there is a positive potential on wire A to cut off rectifier 31b. In event of a coincidence of those two factors, a current will flow from pole 31e to wire D.

Current pulses on wire D have substantially the same wave shape as the step input pulses and appear during the spaces between power pulses. The latter is insured by any suitable means S connecting the source 20 with the step input 30. In accordance with the previous description of Figure 2, any pulse appearing on wire D will create a pulse on wire J one time period later. The delay means 36 may be of any suitable form, for example, a delay line (or in fact another magnetic amplifier), and will delay any pulse on wire J by one time period and apply the same to wire H. The inverter 32 may be simply a transformer with a source of bias in series with its secondary. However, any other type of inverter, for example, a complementing magnetic amplifier, may be used. The inverter 32 functions as follows. Normally the battery 32c applies a potential which tends to cut off the rectifier 31c. However, upon appearance of a pulse on primary 32b, the output 32a of the transformer neutralizes the potential of battery 32c and thus effectively grounds the cathode of rectifier 31c. The transformer is preferably a so-called pulse transformer, that is one capable of reproducing a substantially squarewave input pulse in its output.

Reference is now made to gate 34 which has a source of positive potential 34d connected to the upper end of resistor 34a. In event both rectifiers 34b and 34c are cut off, this positive potential will cause current to be applied to wire E and therefore to the input of the magnetic amplifier 35. However, if either one of the rectifiers 34b or 34c is conducting, the wire E is effectively grounded. Referring first to rectifier 34b, if the secondary of pulse transformer 33b has an induced potential exactly equal and opposite to that of bias battery 33c, the cathode of rectifier 34b is grounded and there is no potential on wire E. Similarly, if there is no potential in the output of delay means 36, the wire H is effectively grounded through primary 32b as well as resistor 36a, whereby wire E is at zero potential. However, if there is positive potential at the output of delay means 36 concurrently with the absence of output on secondary 33b, the cathodes of both rectifiers 34b and 34c will be held at a substantial positive potential and hence the potential on wire E will rise to a substantial positive value.

The inverter 33 functions in like manner to the inverter 32. In the absence of potential in the secondary 33b, the bias battery 33c supplies positive potential to the cathode of rectifier 34b. However, when a step input pulse appears on wire B, current flowing through primary 33a induces a squarewave pulse into secondary 33b which neutralizes the potential of the battery 33c and effectively grounds the cathode of rectifier 34b.

There has been hereinabove described the function of the parts 30 to 37 inclusive in combination with each other, this description being given with particular reference to Figure 3. There has also been given a description of each individual component part with particular reference to Figure 3B. From these two descriptions, anyone skilled in the art can fully understand the detailed functioning of the complete circuit diagram of Figure 3B.

Figure 4:
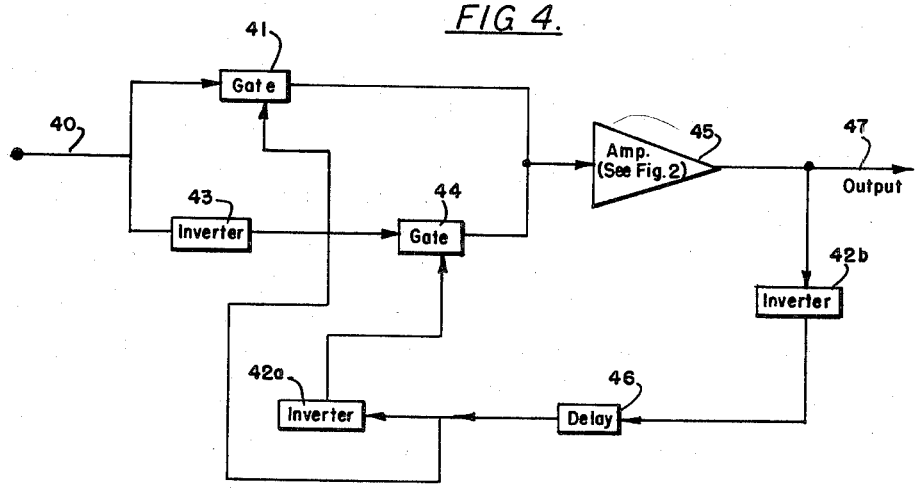
Figure 4 is a block diagram of a modified form of this invention.

Figure 4 is a modified form of the invention in which the inverter 32 is replaced by two inverters 42a and 42b. Otherwise the construction and mode of operation is precisely the same as in the case of Figure 3. In Figure 4 the output of amplifier 45 is fed back to gate 41 in exactly the same way that the output of amplifier 35 is fed back to the gate 31 in Figure 3. The only difference between Figures 3 and 4 in this regard is that the inverter in Figure 4 appears prior to the delay means, whereas in Figure 3 it appears after the delay means. Since in Figure 4 the inversion appears prior to the delay, it is necessary to have another inversion by inverter 42a at the input of gate 44.

Figure 5:
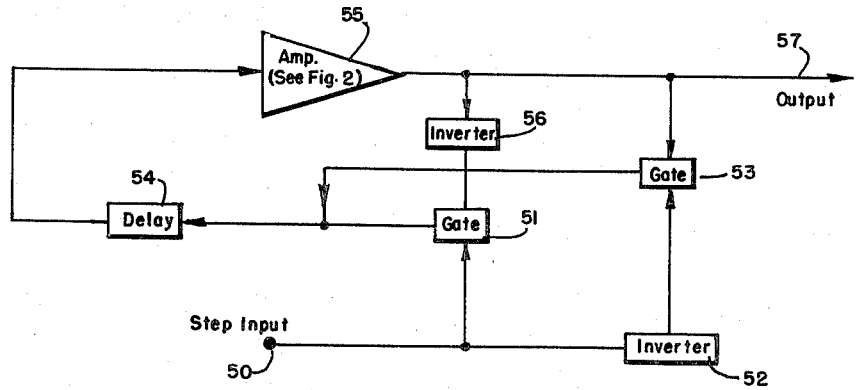
Figure 5 is a block diagram of another modified form of this invention.

Figure 5 is a further modified form of the invention in which the step input 50 feeds gate 51 and inverter 52. The latter feeds another gate 53. So far as the foregoing description of Figure 5 is concerned, it is identical with Figure 3. The only difference between Figure 5 and Figure 3 is that in Figure 5 the delay means 54 appears prior to the amplifier 55 instead of after the same. Otherwise the operation is identical with that of Figure 3.

Figure 6 is a schematic diagram of a modified form of the invention in which sources 60 and 60c of power pulses have outputs as shown in the waveform diagram of Figure 6A. It is noted in Figure 6A that source 60 and 60c of power pulses are alternating current sources in which the power pulses vary from a positive voltage of plus V to a negative voltage of minus V. There is, however, a bias battery 60f in series with power pulse source 60c which causes the power pulses from source 60c to vary about a positive voltage as shown on the lower waveform of Figure 6A. The sources 60 and 60c are synchronized by any suitable means whereby their waveform outputs occur in synchronism and in the relation shown in Figure 6A. The signal input pulses when they appear from source 62 are always timed to occur during a period when the pulses from source 60 are negative, in other words in one or more of the time periods T2, T4, T6, T8 and T10, etc. of Figure 6A.

Assume that at the start there is no output at the load 60b, in other words, assume that the power pulses from source 60 are encountering high impedance in the coil 60a. In order to accomplish this state, there is a "reset" current flowing from battery 61 through coil 61a, resistor 61b and battery 61c during the period between power pulses. Hence, while as shown in Figure 1, the power pulses tend to drive the core from point 14 to point 15, there appears between power pulses a "reset" current in coil 61a from batteries 61 and 61c which tends to reset the core from point 11 to point 14. Hence, during time period T1, for instance, the core is driven from point 14 to point 15 and returns to zero value of magnetizing force 11 at the conclusion of time period T1. During time period T2 no current flows from source 60 or 60c due to the rectifiers 60g and 60e, respectively, and the "reset" current in coil 61a from batteries 61 and 61c drives the core negatively from point 11 to point 13 on the hysteresis loop of Figure 1. The next power pulse at time T3 drives the core positively from point 14 to point 15, etc. Since under these circumstances the core C is not saturated, there is little output at the load 60b, or at output 69.

The first pulse from signal source 62 will occur at one of the time periods T2, T4, T6, T8, etc. and will raise the anodes of rectifiers 63d and 61d to a positive value approximately equal to that of battery 61. Hence, no current will now flow in coil 61a. To explain this operation in a little more detail, it is noted that before the arrival of the pulse from source 62, the wire 63m was at substantially ground potential (even though there is a positive potential on battery 63k) since a current flows from ground through rectifiers 63r and 63d and resistor 62a to negative potential source 62b, whereby the cathode of rectifier 63r and hence wire 63m, will be at substantially ground potential. Hence, substantially the entire potential of battery 63k appears across the resistor 63j. It follows therefore that a pulse on input 62 will cancel the effect of battery 61 and will prevent the flow of a "reset" current in coil 61a. During this time interval no current will be flowing through coil 66 and consequently the next power pulse from source 60 (taken with the power pulse from source 60c) will saturate the core. This follows from the fact that the core remained at point 11 of the hysteresis loop of Figure 1 during the time period at which the pulse appeared from the signal source 62, and consequently the next power pulse could easily drive the core to saturation from point 11 to point 12.

Since the core is substantially saturated for this particular power pulse, the coils 60a and 60d have low impedance and large currents may flow to the load 60b and through the rectifier 60e. A circuit for this current includes battery 65b and resistor 65a. Due to the low winding impedance and the low forward impedance of the diode 60e, a large pulse (negative-going from the +V of source 67a) appears at the connection 69 that is substantially equal to that of the pulse from the source 60c. It is noted that during the period when the signal pulse from source 62 raised the potential at the cathode of rectifier 63d to a positive value, the cathode of rectifier 63c was also being held at a positive value by reason of the bias battery 63a. There was no current flow through coil 66, during the time when signal pulses were emitted by source 62, by reason of the fact that the positive pulse from signal source 62 passed through rectifier 63e and brought connection 63p to a positive value about equal to that of battery 66b. Cumulatively, battery 63a was passing a current through resistor 63b, rectifier 63f, resistor 63g, and battery 63h, to place point 63p at a positive value approximately equal to that of the battery 66b. Hence, there was no potential across coil 66.

As heretofore stated, one time period folowing the signal pulse from source 62 the coil 60d acquired low impedance and a large negative-going power pulse passed therethrough to rectifier 60e and so to the delay line 64 which delayed the same by one time period. If therefore we assume that the signal pulse occurred at source 62 at time period T2, the next power pulse through coil 60d encountered low impedance and occurred at time T3. This latter power pulse was delayed until time period T4 by delay line 64. At time period T4 it neutralized the positive potential of battery 63a and consequently the potential of wire 63q was reduced substantially to ground level. Assuming that there was no input pulse from source 62 at this time period, current will then flow from battery 66b, coil 66, rectifier 66a, resistor 63g, and battery 63h. This current, flowing through coil 66, will exactly neutralize the magnetizing force of the "reset" current then flowing through coil 61a, hence again the core will not be reset during the time period during which signal pulses may appear. As a result, the next power pulse at time period T5 will again flow through coil 60d which then has low impedance to the delay line 64 and will again prevent resetting of the core during time period T6 in like manner to the way the previous power pulse prevented resetting of the core during time period T4. This state of affairs will continue as long as no further pulses appear from the signal source 62 and there will be an uninterrupted train of output pulses at load 60b and also at the negative output 69. The next time a pulse appears from the signal source 62 it will place a positive potential on connection 63p and block flow of current in coil 66 whereby during the time period of this pulse the core will be reset by the current in coil 61a. Such current will flow in coil 61a since point 63q will be substantially at ground potential and will therefore hold wire 63m substantially at ground potential. Consequently, the device will revert to its first stable state in which during the period of the power pulses they will drive the core from point 14 to point 15 and during the interval between power pulses the "reset" current will drive the core from point 11 to point 13. Hence, there will be no substantial output. During the signal period immediately following the appearance of the second input pulse from source 62, there will be no output at 69, hence battery 63a will be connected to the cathode of rectifier 66a through the resistor 63b and rectifier 63f and will place a positive potential on the cathode of rectifier 66a which is substantially equal to the potential due to battery 66b, wherefore coil 66 is again inoperative. This stable state in which there is no output will continue until another pulse is received on input 62 which will have the same effect as the first-named pulse received there, with like effect. As in the case of Figure 3, there will be a series of output pulses in the load 60b for every two pulses from the signal source 62.

Resistor 65a, battery 65b, rectifier 67 and battery 67a, constitute a sneak suppressor circuit for neutralizing any small pulse current that may tend to flow through coil 60d during a period when that coil has high impedance. Battery 65b has a potential greater than +V but rectifier 67 and battery 67a limit the potential on wire 69 to a maximum potential of +V. The small current flowing due to the difference in potential of batteries 65b and 67a will neutralize any sneak current that will flow through coil 60d while the latter has high impedance.

Resistor 62a and batery 62b maintain a current flow through rectifier 63d along the path 63k—63j—63d—62a—62b. The gate 63c, 63d, therefore does not allow current to flow from battery 63k to coil 61a when input pulses are not being emitted from source 62.

Rectifier 63r prevents the anodes of rectifiers 63c and 63d from going negative.

Figure 6B:
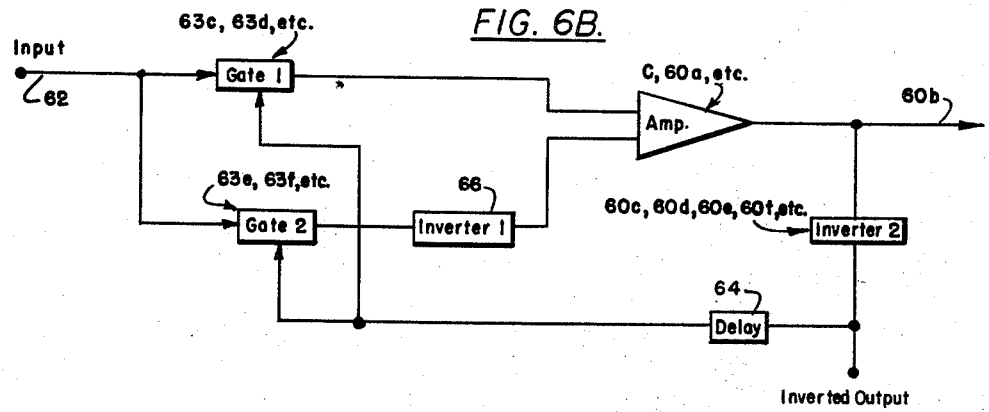
Figure 6B is a block diagram of the circuit of Figure 6.

Figure 6B is a logical (or block) diagram of the apparatus of Figure 6. The several blocks of Figure 6B are marked with the reference numerals of the component parts of Figure 6 composing that block.

In connection with inverter 2 it is noted that this is part of the magnetic amplifier itself, since the battery 60f places a positive bias on source 60c, and the latter causes output pulses to go negative from the level of battery 60f. This is the equivalent of a magnetic amplifier plus an inverter. Likewise, the part 66 is the equivalent of an inverter at the input of the magnetic amplifier. Otherwise the block diagram of Figure 6B is obvious and needs no further discussion.

Figure 7:
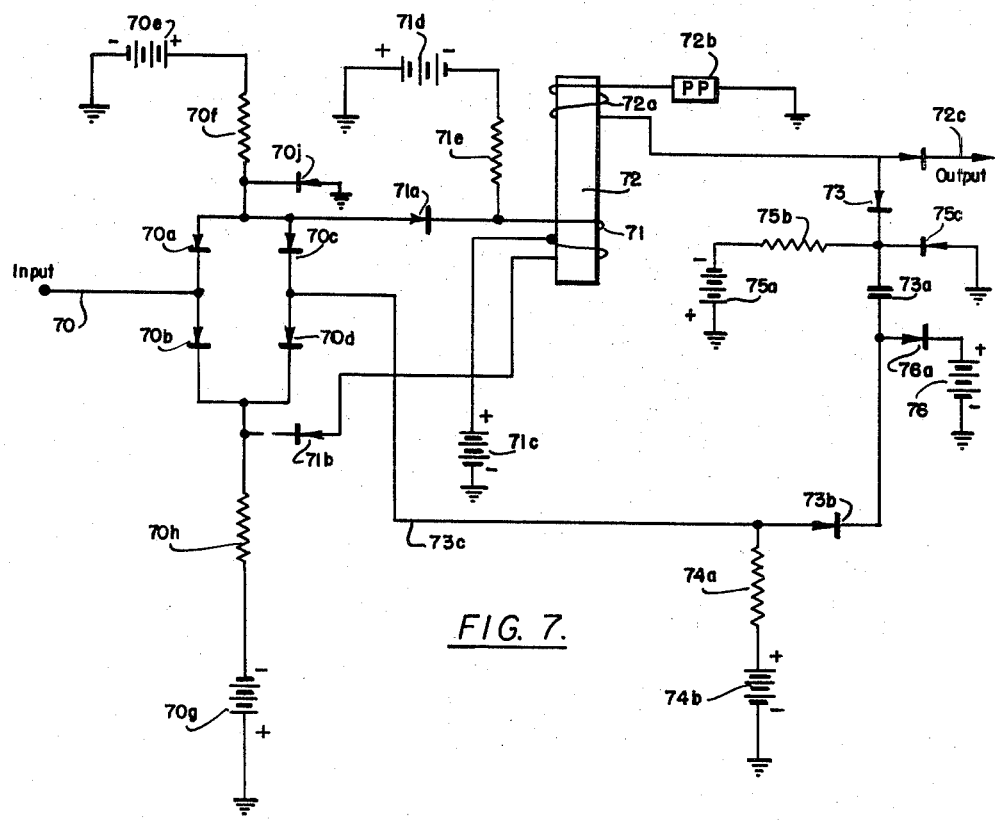
Figure 7 is a schematic diagram of a modified form of the invention.

Figure 7 is a magnetic counter circuit very similar to that of Figure 6 except for the feedback circuit. At the start of the operation of the apparatus of Figure 7, wire 73c is positive, being so held by batteries 74b and 76. Reverting current passes through the upper half of coil 71 by way of battery 71c, the upper half of coil 71, resistor 71e, and battery 71d. Hence, during the spaces between the application of successive power pulses to winding 72a, the core is reverted so that the next power pulse cannot drive the core to saturation. Therefore power pulses occurring prior to the first step input pulse find winding 72a one of high impedance and hence very little current flows from the source 72b to the output 72c. Consequently, there is substantially no charge placed on the feedback condenser 73a by the power pulse.

If we now assume that the first step input pulse arrives at 70, the upper gate 70a—70c will be open since there is positive potential on both wires 70 and 73c. Consequently, current from battery 70e is applied to the anode of rectifier 71a substantially at the potential of the input pulse. There are then substantially equal positive potentials on both ends of the upper half of coil 71 and no current flows through this half of that coil. Accordingly, the core is not reverted during the spaces between power pulses. It follows that the next power pulse from source 72b will find coil 72a having low impedance, hence the pulse will flow to the output 72c and will also flow through rectifier 73 raising the upper plate of condenser 73a to a positive value. When the power pulse from source 72b ceases, the negative potential of battery 75a will tend to lower the positive potential on the upper plate of condenser 73a drawing the potential of the lower plate of that condenser down also, and thus drawing current from battery 74b through resistor 74a and rectifier 73b to the lower plate of condenser 73a. The flow of current through resistor 74a will result in a drop in the potential of wire 73c. It is noted that rectifier 76a and battery 76 are so connected that they merely act as a limiter to prevent potential from rising above that of the battery 76. Hence, no current flows from battery 76 during the aforesaid operation. The current from battery 75a must be larger than the current supplied by battery 74b. That is:

$$\frac{E_{75a}}{R_{75b}} > \frac{E_{74b}}{R_{74a}}$$

In this case, rectifier 75c will have a net current in it, and the cathode of said rectifier will be at substantially ground potential.

At the time of this operation it is noted that the potential on both input 70 and wire 73c approached ground potential and therefore the potential at the cathode of rectifier 71b and at the anode of rectifier 71a is substantially ground potential. This follows since the positive potential of battery 70e appears across the resistor 70f and the potential of battery 70g appears across the resistor 70h. In this case, there will be substantially equal and opposite currents flowing through the two halves of coil 71. A current will flow through the upper half of coil 71, as follows: battery 71c, upper half of coil 71, resistor 71e, and battery 71d. This follows since the rectifier 71a is cut off, its anode being effectively at ground potential. Current also flows from the battery 71c through the lower half of the coil 71, rectifier 71b, resistor 70h, battery 70g, to ground. Consequently, the magnetizing forces of the two halves of coil 71 cancel each other and therefore the power pulses from source 72b flowing through coil 72a will repeatedly saturate the core, giving a continuous series of output pulses at output 72c. This will continue, that is, these output pulses will continue to charge the upper plate of condenser 73a during each pulse. Likewise following each power pulse the upper plate of the condenser will be drawn to substantially ground by battery 75a, thus causing a current to flow through resistor 74a drawing wire 73c substantially to ground potential.

The next or second step input pulse at 70 will raise the potential at the anode of rectifier 70b which will make the cathode of rectifier 71b positive, thus cutting off flow of current through the lower half of the coil 71. Looking at this latter action in another way, it may be noted that the upper end of resistor 70h is rendered positive by the input pulses 70, wherefore both ends of the lower half of the coil 71 are at positive potentials so substantially no current flows. Hence, the flow of current through the upper half of coil 71, resulting from batteries 71c and 71d, will reset the core during the periods between power pulses and consequently power pulses from source 72b will encounter high resistance in coil 72a and there will thus be substantially no output at 72c. The small current produced in 72a by the power pulse when 72a has high impedance is prevented from appearing in the output 72c, as follows.

The current flow from battery 75a through resistor 75b and rectifier 75c will tend to hold the cathode of rectifier 73 at substantially ground potential and therefore any small pulse on output 72c will flow through rectifier 73, resistor 75b and battery 75a to ground, and if the current from 75a exceeds the small current produced by the power pulse, a current will continue to flow in rectifier 75c, maintaining the cathode thereof, and hence the output potential, substantially at ground potential. Since there is no output at 72c the wire 73c will rise to the potential of battery 76. Rectifier 71b will therefore remain cut off and the current flowing in the upper half of coil 71 will reset the core during the spaces between power pulses, inhibiting output at 72c.

The aforesaid second step input pulse stopped all output at 72c. Thereafter the apparatus remained in a condition in which there was no output. The third step input pulse at 70 will cause the same chain of events as the first one, and the fourth step input will have the same effect as the second one, etc. It, therefore, follows that there will be an uninterrupted train of pulses at output 72c for every other pulse appearing at input 70.

Figure 8:
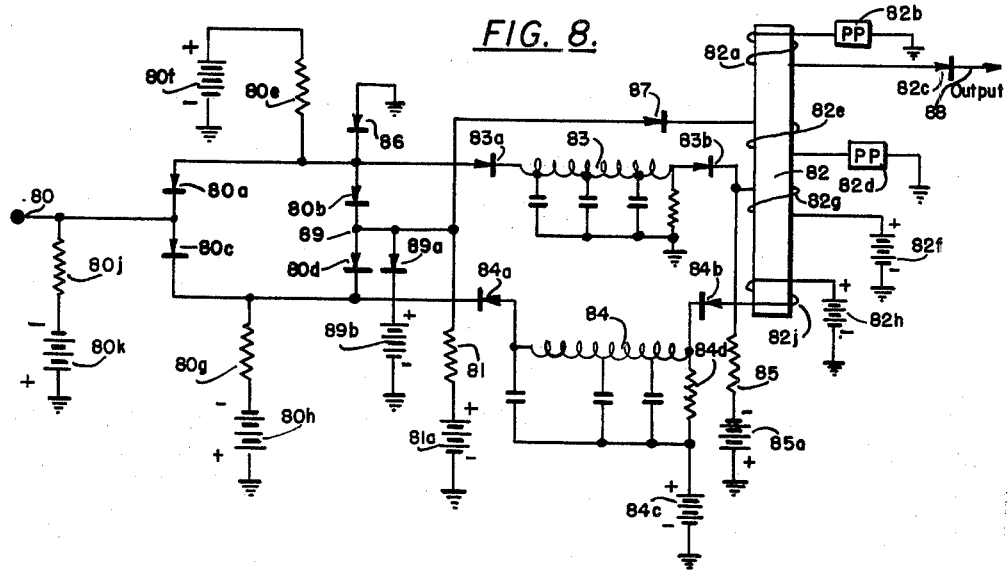
Figure 8 is a schematic diagram of a further modified form of the invention.

Reference is now made to Figure 8 which has two sources of power pulses, 82b and 82d, which respectively have pulse outputs of the type shown in the upper and lower timing waveform diagrams of Figure 6A. However, in Figure 8, the step input pulses are fed to input 80 at a time period simultaneously with the appearance of power pulses instead of at a time period between power pulses. In other words, the input pulses of Figure 8 would be fed at one or more of the times T1, T3, T5, T7, T9, etc. of Figure 6A.

In Figure 8 the condition of the apparatus immediatey prior to the application of the first step input pulse is as follows: current from battery 82f flows through coil 82g, resistor 85 and battery 85a and resets the core during the spaces between power pulses. Hence, when the power pulses arrive they find that coils 82a and 82e have high impedance and hence there is very little current flow through these coils. Moreover, at the time of the first input pulse at input 80, the battery 81a, operating through resistor 81, holds the anode of rectifier 80d and the cathode of rectifier 80b at a high positive potential determined by battery 89b. This conditions the upper gate 80a—80b so that when a step input pulse appears at input 80 and raises the potential of the cathode of rectifier 80a, current can now flow from battery 80f through resistor 80e and will be impressed upon rectifier 83a, delay line 83 and rectifier 83b at the input pulse potential, this will cut off further flow of the reset current which is otherwise passing through coil 82g.

It is noted that the delay line 83 delayed the pulse by one time period. In other words, if the step input pulse appeared at time period T1 of Figure 6A, the delay line 83 delayed the effect of it until time period T2 and prevented the coil 82g from resetting the core during the time period T2. The next negative going power pulse from source 82d then passes through coil 82e which has low impedance (since the core was not reset during the immediately preceding time period), and thence through rectifier 87 and cancels the positive bias set up at wire 89 by battery 89b. Normally the positive bias of battery 89b is applied to the cathode of rectifier 80b as aforesaid, but since the pulses from source 82d are negative going, as shown in Figure 6A, they effectively cancel the aforesaid bias of battery 89b. Hence, the upper gate is effectively cut off since current may readily flow through rectifier 80b to wire 89 which is now substantially at ground potential. During this latter event, the potential of battery 80f appeared across resistor 80e. The potential at the anode of rectifier 80d was lowered to substantially ground potential and therefore this rectifier did not prevent current from flowing from battery 80h, to resistor 80g, to rectifier 84a, delay line 84, rectifier 84b, winding 82j, and battery 82h. The delay line 84 delayed this pulse by one time period and therefore it arrived at the winding 82j during a space between power pulses, in other words, at one of the times such as T2, T4, T6, T8, etc. of Figure 6A, and the delayed pulse cancelled the magnetizing force of coil 82g during one of the said periods. Hence, the power pulses which are emitted by sources 82b and 82d during the next time period will pass through coils 82a and 82e which then have low impedance. Consequently, there will be an uninterrupted train of power pulses at the output 88 until, as described below, another pulse appears at the input 80.

The next step input pulse at input 80 raises the potential at the anode of rectifier 80c to a positive value and allows current to flow from the input 80 through resistor 80g and battery 80h. The potential of the input pulse appears as a drop across resistor 80g and consequently the upper end of resistor 80g is no longer at ground potential and consequently current ceases to flow through coil 82j. Therefore the reset current which flows through coil 82g from battery 82f will reset the core during the period between power pulses and consequently the next power pulse will not produce a substantial output. The step input pulse ceases before the next power pulse. The next negative going power pulse from source 82d will find winding 82e with high impedance and consequently the point 89 will no longer be driven to a negative value and will again assume a positive value by reason of batteries 81a and 89b. Consequently no further current will flow from either the upper gate 80a—80b or the lower gate 80c—80d to either of the windings 82g or 82j. The upper gate will remain cut off since current will flow from battery 80f, resistor 80e, rectifier 80a, resistor 80j and battery 80k. Hence, the potential of battery 80f will appear across resistor 80e and there will be no positive potential at the anode of rectifier 80a which will be at substantially ground potential. Likewise, the anode of rectifier 80c will be at ground potential (since the step input pulse will have ceased by this time) and therefore no current will flow from the cathode of that rectifier through rectifier 84a to coil 82j. Hence, the apparatus will continue to operate in the condition whereby the current from batteries 82f and 85a resets the core through coil 82g during the spaces between power pulses, thus rendering the coils 82a and 82e high impedance during subsequent power pulses. This condition will continue until the next step input pulse arrives at input 80 which will have the same effect as the first step input pulse which arrived at input 80. Consequently, there will be a single uninterrupted train of output pulses for every two step input pulses that appear at the input 80. The rectifier 86 prevents the anode of rectifiers 80a and 80b from going negative. Battery 82h has a small positive potential but this battery is not absolutely necessary and may be omitted. Rectifier 89a and battery 89b constitute a sneak suppressor which neutralizes any sneak currents tending to flow toward point 89 from source 82d during periods when coil 82e has high impedance. The potential of battery 84c is about equal to that of battery 89b and serves simply as the equivalent of a ground return for the terminating resistor 84d of delay line 84. From another point of view, since the outputs from 82e are negative going from a positive level, it is necessary to refer the delay line to approximately the same positive level.

Figure 9A:
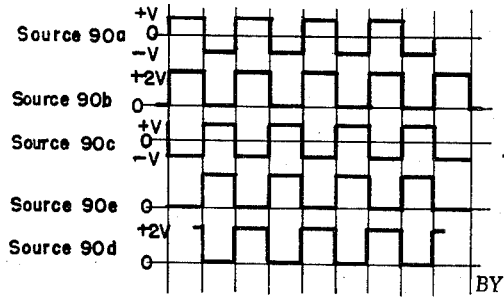
Figure 9A is a timing diagram of the device of Figure 9.

Figure 9 is a schematic diagram of a modified form of the invention in which there is a feedback connection that includes a second magnetic amplifier. Figure 9A is a timing wave-form diagram of the several power and blocking pulse generators 90a to 90e inclusive of Figure 9. Prior to the first pulse, we will assume the following state of the several component parts of the apparatus: Pulses will flow from pulse generator 90a through coil 92a without substantial impedance, since neither of coils 92b nor 92c have reverting currents flowing therein. The heavy current flow through coil 92a will pass through rectifier 94c to coil 94d and will repeatedly reset core 94 during the spaces between the power pulses of generator 90d, whereby there will be very little output current from pulse generator 90d flowing through coil 94a. Consequently, since there is little output from pulse generator 94a, the battery 95 will raise the potential on wire 97 to a positive value determined by battery 96. This will place a positive potential on the cathode of rectifier 91b thus enabling the upper gate to have an output whenever a step input pulse appears at input 91. The positive potential on the anode of rectifier 91d will cause current to flow therethrough, thereby raising the potential of the anode of rectifier 92e and will prevent substantial current flow through the coil 92c during the spaces between the power pulses of source 90a. The latter result follows from the fact that the two ends of winding 92c each have applied thereto substantially equal positive potentials, during the spaces between positive power pulses from 90a, the left end deriving its potential as hereinabove described, and the right end deriving its potential from the pulse source 90c, hence no current can flow from the positive pole of source 90c through rectifier 92e because the latter rectifier is substantially biased off as hereinabove described.

It is noted that pulse generator 90e puts out a large blocking pulse during the periods between the positive pulses of source 90a. The purpose of the positive pulses of source 90e is to prevent any flow of current through coil 94d due to the voltage induced therein by the current flowing in winding 94a during the time that voltage from the source 90d is at ground level as shown in Figure 9A. It will be observed that source 90d may be any suitable source capable of an output having the waveform shown at the bottom of Figure 9A. The source 90d is connected with its positive pole in contact with the positive pole of the battery 94f. Moreover, the source 90d has a maximum potential approximately equal to that of battery 94f. Hence, whenever a pulse appears from source 90d it neutralizes the potential of the battery 94f and the combined potential of battery 94f and source 90d is zero. However, the change in current in coil 94a which results from the pulsing of source 90d tends to induce a voltage in coil 94d in such a direction as to cause current to flow therein. Also there may possibly be leakage currents flowing through rectifier 94c into coil 94d. The purpose of pulse generator 90e is to provide a large positive pulse during the period of the pulses of source 90d which will bias rectifier 94c so as to prevent current flow therethrough.

With the foregoing background, assume that the first step input pulse arrives at wire 91 at a time between two positive power pulses of source 90a. The potential at the cathode of rectifier 91a will now rise and a reset current will flow from battery 91e through coil 92b during the space between two of the positive power pulses emitted by source 90a. The sole purpose of the pulse generator 90b is to produce blocking pulses in the same way and with like effect to the blocking pulses produced by source 90e. Since the signal pulses always occur during the spaces between positive power pulses of source 90a, the blocking pulse generator 90b will be inoperative during this period and will therefore not prevent the output at the upper gate from resetting the core through coil 92b. Since the core is reset during the space between two of the power pulses from source 90a, the second of these power pulses will meet high impedance in coil 92a and will not cause a current to flow through the rectifier 94c and consequently the core 94 will not be reset during the space between the pulses of source 90d. The next power pulse from source 90d will neutralize the effect of battery 94f and consequently there will in effect be a connection of substantially zero resistance between the upper end of coil 94a and ground. Consequently, current from the battery 95 will tend to flow through resistor 95a, rectifier 94b, coil 94a, to ground. Most of the drop will occur across resistor 95a and this will reduce the potential on wire 97 to substantially ground potential. Consequently, current may now flow from pulse generator 90c through coil 92c, rectifier 92e, resistor 91g, and battery 91h to ground, whereby there is a reverting current in coil 92c. There is no reverting current in coil 92b during this period since the upper gate is cut off due to the fall in potential on wire 97. The reverting current in coil 92c causes the next power pulse from source 90a to meet high impedance in coil 92a so it will not pass current to the coil 94d. Hence, the core 94 is not reverted and current may therefore flow from battery 95 through the coil 94a to ground whenever there is a negative pulse from source 90d counteracting the potential of battery 94f. Consequently, during the periods when signal pulses may be expected, the potential on wire 97 repeatedly drops to ground potential and therefore there are no reverting currents in coil 92b, but there are reverting currents in coil 92c, hence no outputs from coil 92a. This condition continues until the second step input pulse is received at 91 which has the effect of placing a large positive potential at the anode of rectifier 91c thus raising the cathode of that rectifier to a positive value and preventing flow of current from the source 90c through coil 92c. Hence, the core 92 is not reverted during the spaces between power pulses from source 90a and the next power pulse from source 90a will flow through coil 94d and revert the core 94 so that it will present high impedance to the next pulse that tends to flow through coil 94a. Hence, when in fact the next power pulse from source 90d arrives, it will, as previously, cancel the effect of battery 94f, but when the current begins to flow from battery 95 through coil 94a it will meet high impedance in the coil 94a and consequently the potential on wire 97 will remain at the potential of the battery 96 instead of dropping to substantially ground potential as previously. This positive potential on wire 97 will prevent coil 92c from reverting the core in the way heretofore mentioned and since there is no step input pulse at input 91, the coil 92b will not revert the core 92 and consequently power pulses from source 90a will continue to cause current to flow through coil 94d. Likewise, coil 94a will continue to present high impedance to the current from the battery 95 and consequently the wire 97 will remain at the potential of the battery 96.

The third step input pulse at 91 will start the same chain of events as the first one and will therefore pass reverting current through coil 92b and stop the flow of power pulses from source 90a to coil 94d wherefore the coil 94a will present low impedance to pulses from the battery 95 and the potential on wire 97 will drop to substantially ground potential.

The fourth step input pulse on input 91 will have the same effect as the second step input pulse and will revert the apparatus to the second of its two stable states. It is noted that in one stable state the pulses from source 90a supply current to the load 93 through rectifier 93a. Hence, there is an uninterrupted train of pulses starting with the power pulse next following the second step input pulse and continuing until the third step input pulse. Between the second and third step input pulses there will be outputs at the load 93. Between the third and fourth step input pulses there will be no pulses arriving at the load 93.

During the intervals when there is high impedance in the coil 92a a small current might tend to flow from the pulse generator 90a to the winding 94d and to the load 93. In order to prevent such current flow, a battery 93c is provided along with resistor 93d and rectifier 93b. These components tend to pass a current through the load 93 in exactly the opposite direction to the small "sneak" current which tends to flow through coil 92a during the high impedance periods thereof. However, the rectifier 93b is provided and so connected as to conduct the current flowing from battery 93c through resistor 93d to ground. The said small current in winding 92a has the effect of reducing the current in rectifier 93b; and the current supplied by battery 93c may in fact be so chosen by selection of resistor 93d that the said small sneak current is the lesser of the two, wherefore the cathode of rectifier 93b will remain substantially at ground potential in the presence of the said small sneak current, without however substantially impeding the flow of output current through winding 92a to the load 93 when winding 92a is of low impedance. Hence, these so-called "sneak" currents are compensated for by the battery 93c, et al.

Figure 10A:
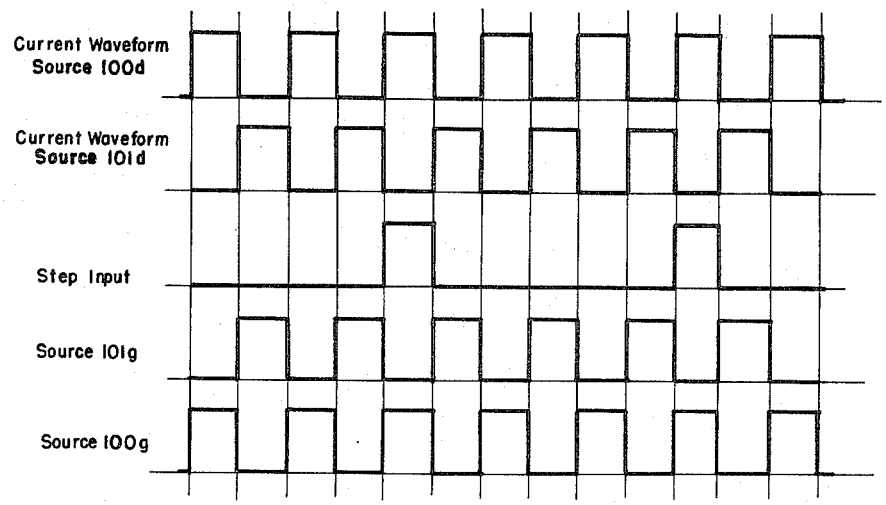
Figure 10A is a timing diagram of the device of Figure 10.

Figure 10 is a schematic diagram of a modified form of the invention using two magnetic cores 100 and 101. The timing waveform diagram of Figure 10A illustrates the waveforms of the various sources of power pulses of Figure 10. The magnetic amplifiers or transformers 100 and 101 operate in a somewhat different fashion from those of the other figures, and consequently a detailed description will be given.

Referring first to core 100, it is noted that it has coil 100c connected to source of power pulses 100d through rectifier 100e. There is a resetting winding 100b and a secondary output winding 100a. Assuming that prior to any given power pulse the core is operating at point 11 on the hysteresis loop of Figure 1, the next power pulse from source 100d will drive the core to point 12 and there will be very little flux change in core 100 and consequently very little potential induced in coil 100a. The next power pulse will have the same effect. As long therefore as the core continues to operate on the saturated portion thereof, the induced potential in the secondary coil 100a will be very small.

On the other hand, if during the period between two power pulses from source 100d, current flows through reset coil 100b, the core will be driven from point 11 to point 13 on the hysteresis loop of Figure 1. The next pulse from source 100d will then drive the core primarily along an unsaturated portion thereof from point 14 to point 15 on the hysteresis loop of Figure 1, producing a large flux change in the core 100, and therefore a large potential will be induced in secondary coil 100a. In other words, if there are a series of resetting pulses in coil 100b occurring during the spaces between power pulses from 100d, there will be a series of large output pulses from secondary 100a. On the other hand, if there are no resetting pulses in coil 100b, the pulses from source 100d will drive the core to saturation during each pulse and there will be very little output in the secondary 100a. Source 100g produces blocking pulses and normally does not enter into the operation of the device except merely to prevent current flow in reset coil 100b during time intervals when such current is not desired. For example, pulses to reset coil 100b are supplied by the secondary 101a of core 101. The pulses from coil 101a normally occur during the spaces between pulses from source 100d (since they are due to pulses from source 101d) as shown in Figure 10A. In order to prevent the voltage induced in reset coil 100b due to the power pulses 100d from producing current in coil 100b, the blocking pulse generator 100g emits positive pulses which tend to cause current to flow through reset coil 100b but such current may not so flow due to rectifier 107 which is connected in the opposite direction to permit pulses from source 100g to flow. Therefore source 100g merely opposes or neutralizes any voltage that will tend to be induced in coil 100b due to current in coil 100c.

The magnetic transformer 101 operates in a manner quite similar to that of transformer 100. It has a secondary coil 101a, a reset coil 101b and a primary winding 101c. The primary winding is fed by a source of power pulses 101d through rectifier 101e. The relation of the power pulses of source 101d and those of source 100d is shown in Figure 10A. In order to prevent flow of current in the reset coil 101b, due to induction from coil 101c, the blocking pulse generator 101g may be employed. Its polarity is such that current therefrom may not flow due to the rectifiers 105 and 106, which prevent such flow. Hence, if during any given power pulse from source 101d a voltage is induced in coil 101b, the blocking pulse generator 101g will oppose or neutralize any such voltage and prevent current from flowing in the input circuits of the apparatus.

The function of the lower gate (104 to 104k) will now be explained. In the absence of a step input pulse at 102, current will flow from battery 104 through resistor 104a, resistor 104d and rectifier 104c to battery 104e. The voltage of batteries 104 and 104e and the values of resistors 104a and 104d are so chosen that in this case a current will also flow from ground through rectifiers 104k and 104c and resistor 104d to battery 104e. Hence, the anode of rectifier 106 and wire 104m connected thereto will be at substantially ground potential. If there is no input pulse through the primary winding 104g of pulse transformer 104f, the battery 104j will place a positive potential on the cathode of rectifier 104b. If then a pulse is received at step input 102 without a pulse being simultaneously received in primary 104g, the upper end of resistor 104d will be raised to a high positive value, rectifier 104c will be cut off and a current from battery 104 will be placed on output lead 104m substantially at the potential of the input pulse at 102. Therefore an output pulse will appear in wire 104m which will flow through rectifier 106 and reset coil 101b to ground.

On the other hand, if a pulse on the step input 102 is received concurrently with a pulse in the primary 104g of pulse transformer 104f, there will be no output at wire 104m for the reason that the potential induced in secondary winding 104h will be substantially equal and opposite to that of battery 104j, thus grounding the cathode of rectifier 104b. If rectifier 104b is effectively at ground potential, it will hold wire 104m at ground potential and there will be no output pulse.

The two pulse transformers 103f and 104f are of the well known type which has a substantially square wave output across the secondary when a square wave is applied to the primary.

The operation of the upper gate (103 to 103k inclusive) is substantially identical to that of the lower gate (104 to 104k inclusive). In the absence of input pulses on wires 102 and 109, the potential at output wire 103m of the upper gate will be zero. This follows from the fact that batteries 103 and 103j have potentials so related to the resistances of resistors 103a and 103d that current will flow from ground through rectifiers 103k and 103b and resistor 103d to battery 103j, leaving the cathode of rectifier 105 and wire 103m at substantially ground potential. The cathode of rectifier 103c will be held at a substantially positive potential due to the battery 103h, in the event there is no input in the primary winding 103e of the pulse transformer. Hence, in the absence of energization of the primary of the pulse transformer, rectifier 103c will be cut off. If then a positive pulse appears on wire 109, the cathode of rectifier 103b will rise to a positive value and current from battery 103 will be impressed on wire 103m substantially at the potential of wire 109 and current may then flow through rectifier 105 to reset coil 101b.

If, however, a pulse appears on wire 109 simultaneously with the step input pulse on wire 102, there will be no output at wire 103m because the step input pulse will induce a potential in the secondary 103g which is equal and opposite to the potential of battery 103h, thus effectively grounding the cathode of rectifier 103c, thereby effectively grounding the wire 103m. Hence, the operation of the upper gate may be summarized by stating that there will be an output pulse on wire 103m wherever there is a pulse on wire 109 except during those intervals when there is a pulse in the primary 103e simultaneous with a pulse on wire 109.

With the foregoing background, it is now possible to explain the normal idle condition of the apparatus which prevails at the time that the first step input pulse is received. Prior to the first step input pulse there is no potential on either of wires 103m or 104m and consequently no current flow in reset coil 101b. Hence, the pulses of source 101d repeatedly saturate the core 101 and there is no output in secondary 101a. It follows that there is no input to the reset coil 100b of core 100 and that consequently the pulses from source 100d repeatedly saturate the core and there is accordingly no potential induced in the secondary 100a. Consequently there is no current in either of outputs 108 or 109. It follows therefore that there is no current flowing in primary 104g and that the cathode of rectifier 104b is biased to a positive value by battery 104j and therefore is cut off. If then we assume that the first step input pulse is received on wire 102, it will raise the potential of the cathode of rectifier 104c to a positive value, thus allowing battery 104 to place a positive potential on wire 104m which will cause current flow through rectifier 106 and reset coil 101b to ground. The core 101 will therefore be reset during the interval between power pulses of source 101d and the next power pulse will induce a current in secondary winding 101a which will produce a current flow in reset coil 100b during spaces between power pulses of source 100d. The next power pulse from source 100d will induce current in secondary winding 100a which will produce output pulses in wire 109 and in primary winding 104g. If during the time of a pulse in primary 104g another step input pulse is received at 102, it will have no effect on the output 104m which will remain at zero. If there is no step input pulse at 102 at the time of the pulses on wire 109 due to the current induced in secondary 100a, the upper gate will be biased to allow current from battery 103 to flow to wire 103m and thus again feed reset coil 101b. Consequently if we assume that no further step input pulses are received following the first one, there will be a recycling of the apparatus since the output of secondary 100a will feed pulses through wire 109 to the cathode of rectifier 103b thus cutting off this rectifier and allowing pulses to flow from battery 103 through wire 103m and reset coil 101b. This will continue to reset core 101 and allow power pulses from source 101d to induce current in coil 101a which will pass current in reset coil 100b and thus reset core 100 whereby the power pulses from source 100d will continue to induce current in secondary 100a which will continue to feed current to wire 109 which will continue to open the upper gate to the flow of further current from battery 103 to wire 103m, etc. This recycling will continue until the next input pulse is received at 102 and during this recycling output pulses will appear on wires 108 and 109 but in different phases.

If it now be assumed that at some later time the second step input pulse is received at wire 102, it will cut off the upper gate and since the lower gate is already cut off there will be no potential on either of wires 103m or 104m. The upper gate will be cut off by reason of the fact that the step input pulse will induce potential in the secondary 103g which is substantially the equal of, and is opposite to, the potential of battery 103h whereby the cathode of rectifier 103c is effectively grounded, hence wire 103m is effectively grounded. There will be no potential in wire 104m at this time because simultaneously with the step input pulse there will have been a pulse on wire 109 which will have induced a potential in secondary 104h substantially the equal of, and opposite to, the potential of battery 104j thus effectively grounding wire 104m through rectifier 104b. Consequently there will be no current flow through reset coil 101b and the core 101 will be saturated by the next power pulse from source 101d. Therefore there will be no output from secondary 101a and no reset current in coil 100b. Consequently the next power pulse from source 100d will saturate the core 100 and there will be no output from secondary 100a and therefore the pulses on both outputs 108 and 109 will stop.

Assuming that this second power pulse is not followed by any subsequent power pulses for a considerable period of time, then both the upper and lower gates will remain inoperative. The lower gate will remain inoperative since the cathode of rectifier 104c is at substantially ground potential in the absence of input pulses, hence wire 104m is at substantially ground potential. Likewise, the upper gate will hold wire 103m at substantially ground potential since the potential drop across resistor 103a is equal to the potential of battery 103 and the potential drop across resistor 103d is equal to the potential of battery 103j. In other words, both the upper and lower gates will be cut off for the same reason that they were cut off before the first step input pulse was received. This condition will continue until the third step input pulse is received which will have the same effect as the first step input pulse. Likewise the fourth step input pulse will have the same effect as the second one. It follows therefore that after the first step input pulse there will be an uninterrupted train of power pulses on wires 108 and 109 continuing until the second step input pulse. Following the second step input pulse, there will be no pulses on wires 108 and 109 until the third step input pulse is received, at which time there will again be an uninterrupted train of output pulses on wires 108 and 109 until the fourth step input pulse is received, etc. Consequently, there will be a single uninterrupted train of output pulses on wires 108 and 109 for every two step input pulses on wire 102.

Figure 11:
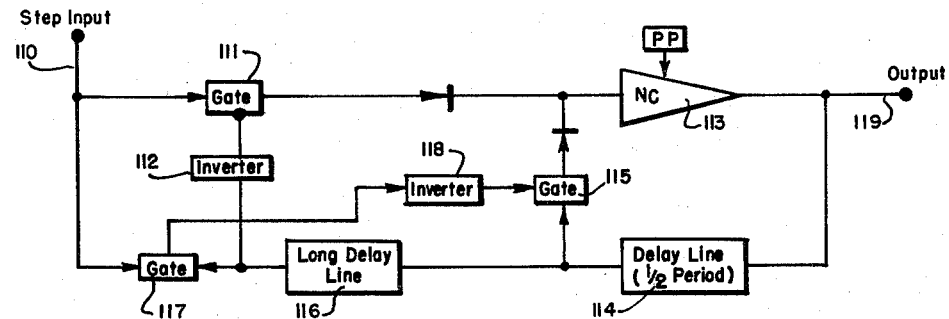
Figure 11 is a block diagram of a modified form of the invention in which a "long delay line" insures that the device remains in one stable state at least a predetermined time before it can be flipped to another by the next step input pulse.

Figure 11 is a block diagram of a modified form of the invention which differs from the others in function, in that there must be a predetermined time spacing between two step input pulses in order for the second one of the two to be effective. The apparatus uses gates, inverters, and non-complementing amplifiers of the type already described.

When the apparatus is in the normal position awaiting the first pulse, there is no input to the inverter 112 and consequently it is enabling gate 111 so that the latter will pass any step input pulses on wire 110. Upon arrival of the first input pulse, gate 111 is open, allowing the pulse to pass to the non-complementing amplifier 113. Hence, the next power pulse fed to this amplifier passes therethrough to the output 119 and also to the delay line 114. This delay line delays the pulse by one-half period, which means that the delayed pulse will pass through the gate 115 and arrive at the input of non-complementing amplifier 113 during the signal pulse time period thereof and will therefore so trigger the non-complementing amplifier that the next power pulse will travel therethrough to the delay line 114 and gate 115 in time to constitute another signal input pulse that will again trigger the non-complementing amplifier so that the next following power pulse will pass to the delay line 114, etc.; and consequently the apparatus will continue in this stable state, giving an uninterrupted train of output pulses at 119. The output of the delay line 114 is fed to the long delay line 116 which triggers gate 117. Gate 117 is open only when it is simultaneously energized by both the output of the long delay line and by a step input pulse from 110. When signals from both of these sources occur simultaneously, gate 117 allows current to flow to inverter 118 which, due to its inversion properties, inhibits the gate 115 and therefore stops current flow therethrough.

The second input pulse at 110 will tend to stop the cycling operation heretofore described, but only if it occurs after a given period of time from the first input pulse. Until the first input pulse has triggered non-complementing amplifier 113 and outputs therefrom have passed through delay line 114 and delay line 116 to inverter 112 and gate 117, the gate 117 remains closed and will therefore not function in response to a second step input pulse. However, if the second step input pulse arrives at a sufficient time period after the first one, the first pulse will have triggered the non-complementing amplifier, outputs therefrom will have passed through delay line 114 and long delay line 116, and will have opened gate 117 so that the second pulse will pass through the gate 117 and inverter 118, thus stopping the triggering of gate 115 and stopping the flow of the recycling current through gate 115 and hence stopping the recycling operation. Hence, there will be no output pulses at 119. Preferably the long delay line should delay the signals fed therethrough by an integral multiple of the period of the power pulses.

The third step input pulse must likewise follow the second one by said predetermined time period, otherwise it will not be operative to restart the recycling operation. For a predetermined time after the cessation of the recycling current resulting from the opening of gate 115, there will continue to be pulses at the output of the long delay line 116 which will be inverted at the inverter 112 and consequently there will be no triggering input pulses to gate 111 and consequently this gate will not be receptive to the third pulse on the step input 110. If, however, the third step input pulse is spaced from the second one by such a long time period that all of the recycling pulses have passed through the delay line 116 so that there is nothing at the output of this delay line, then the inverter 112 will be producing an output which will trigger the gate 111 and allow the third step input pulse on wire 110 to pass through the gate 111 and start the device recycling the same as did the first pulse.

Figure 11A:
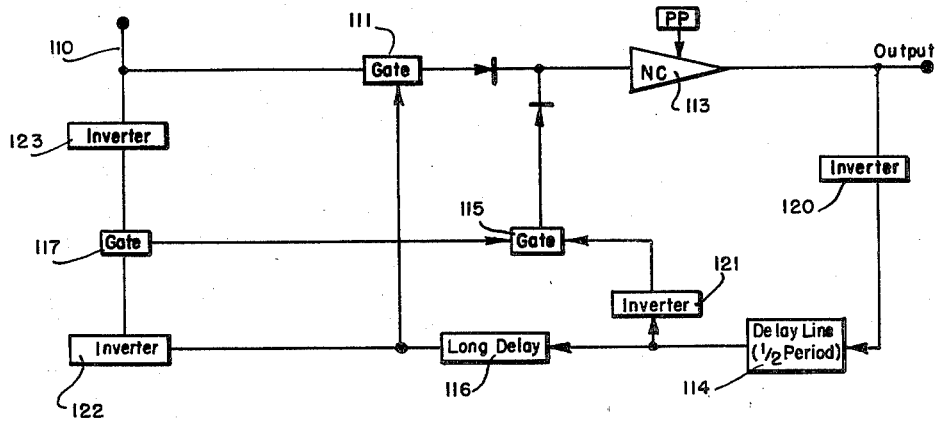
Figure 11A is a modified form of the device of Figure 11.

Figure 11A is a modified form of Figure 11 showing that the inverters may be placed in different positions without changing the mode of operation or the result. For example, in the recycling path of Figure 11, there is no inverter, whereas in Figure 11A there are two inverters 120 and 121. The two inverters taken together are the equivalent of no inverter. However, the inverter 120 is in the path from the output of non-complementing amplifier 113 to the long delay line 116 and this path has no inverter in Figure 11. However, in Figure 11A there is an inverter 122 in the output of the long delay line which means that between the output of the non-complementing amplifier 113 and the gate 117, there are no inverters in Figure 11 but two inverters in Figure 11A, and hence the result is the same. Between the output of non-complementing amplifier 113 and the triggering input of gate 111 there is, in Figure 11, only one inverter, namely, 112, and in Figure 11A there is likewise but one inverter, namely, 120. Hence, so far as this path of current flow is concerned there is the equivalent result since there is just one inverter. In the place of inverter 118 of Figure 11 there is employed in Figure 11A the inverter 123. This causes gate 117 to operate in inverse relation to the way gate 117 of Figure 11 operates, and therefore inverted signals are applied to the gate 115 of both Figures 11 and 11A. Consequently the over-all mode of operation of these two figures is essentially the same.

Figure 12 is a schematic diagram of the circuit of Figure 11. An elaborate discussion of Figure 12 is deemed unnecessary since the gates 111, 115 and 117 are of types repeatedly described in detail in this application. Inverters 112 and 118 are likewise of types repeatedly described. Moreover, the non-complementing amplifier 113 was described in detail in connection with Figure 2.

At the outset, the non-complementing amplifier is giving no outputs since the battery 113c is feeding current through coil 113g, resistor 113d, and rectifier 113f to ground, whereby there is a reset current between power pulses of source 113e whereby those power pulses meet high impedance in coil 113g. Hence, there is no output at 119. The gate 111 is held open so that any pulses on step input 110 will cause current to flow from battery 111d to coil 113a. The gate is responsive to such input pulses since the battery 112a biases the rectifier 111e to cut-off. Consequently when the step input pulse at 110 raises the potential of the cathode of rectifier 111f to a positive value, current flows from battery 111d through coil 113a and thus cancels the effect of the reset current from battery 113c. Hence, the power pulses from source 113e will repeatedly saturate the core 113b and will pass through delay line 114 which will delay them by one-half period. They are then fed to gate 115. The battery 118b biases the rectifier 115e to cut-off so that when a pulse arrives from the delay line 114 to the cathode of rectifier 115f, current may now flow from battery 115a through the coil 113a to thus neutralize the the effect of the reset current from battery 113c. Hence, there will be a continuous recycling with the pulses being fed through the long delay line 116 to the gate 117. These pulses will hold the gate 117 responsive to the next step input pulse 110 so that the next step input pulse will raise the cathode of rectifier 117g to a positive value thus permitting battery 117a to pass current through resistor 117b to the primary 118a of the inverter 118 whereby the potential induced in the secondary of that inverter is equal and opposite to the potential of battery 118b thus in effect grounding the cathode of rectifier 115e and preventing further flow of current from battery 115a to the coil 113. Hence, the second step input pulse will cut off the flow of recycling current in the non-complementing amplifier.

It is also noted that pulses from the output of long delay line 116 will cause current to flow through the primary of pulse transformer 112b and induce a potential in the secondary thereof approximately equal and opposite to the potential of battery 112a whereby the cathode of rectifier 111e will be effectively grounded thus preventing the step input pulses from passing through gate 111 until all of the pulses have completed their travel through the long delay line 116. The several gates each have an input consisting of two batteries and two resistors in series with the rectifiers, for example, gate 111 has battery 111d in series with resistor 111a, rectifier 111f, resistor 111b, and battery 111c. A similar circuit exists in the gate 115, composed of the parts 115a, 115b, 115d, 115c and 115f. A similar circuit is in gate 117, consisting of parts 117a, 117b, 117c, 117d and 117g. In all of these circuits, when there is no positive pulse at the cathode of the rectifier, current flows between the two batteries and the center point on the rectifiers is effectively at ground potential. However, when positive potential appears on the cathode of the rectifier the latter is cut off and current is fed to the output of the gate if the other rectifier of the gate is also cut off.

Figure 13 illustrates a parallel type of magnetic amplifier in which a source of potential 130 may normally feed current through resistor 131 and rectifier 132 to the coil 133 on saturable core 134. As long as there is no reset pulse in winding 135 the core 134 will remain saturated, the coil 133 will have low impedance relative to load resistor 136 and there will be little if any current flowing to the load 136. When the power pulse is negative current flows in the circuit comprising parts 130, 131, 137 and 138, bringing the anodes of rectifiers 132, 137 and 139 to a potential below ground, thereby disconnecting the load 136 and simultaneously applying a blocking voltage to rectifier 132 thereby preventing any current flow in coil 133 due to resetting current in winding 135.

When reset pulses appear at reset winding 135 during spaces between power pulses of source 138, the core will be reset to point 14 on the hysteresis loop of Figure 1. When the next power pulse appears from source 138, it will bias the cathode of rectifier 137 positively so as to cut off any current flow through that rectifier, causing current to then flow from positive pole 130 through resistor 131, rectifier 132, and coil 133. This pulse of current will meet high impedance in the coil 133 which will tend to drive the core from point 14 to point 15 on the hysteresis loop. Since the impedance is high through coil 133 as well as through rectifier 137, a large flow of current will pass from positive pole 130 through resistor 131 to the load 136. As long as reset current continues to flow in coil 135 during the spaces between power pulses, there will continue to be a pulse in the load 136 corresponding to each pulse of source 138.

Figure 14 is a schematic diagram of a magnetic counter circuit embodying a non-complementing magnetic amplifier substantially the same as that of Figure 13. Similar parts in Figures 13 and 14 bear like reference numbers.

Prior to the first step input pulse, current flows from positive pole 130 through resistor 131, rectifier 132, and coil 133 to ground. This saturates the core and thus in effect the coil 133 grounds the lower end of resistor 131. Consequently no current from the positive pole 130 will appear at the output 144. During this period of time, there is no pulse upon input 140 and therefore current flows from positive pole 141g through resistor 141f, rectifier 141a, resistor 140a to negative pole 140b. As a result, the wire connecting the lower end of resistor 141*f* to the anode of rectifier 143 is held at substantially ground potential. The anode of rectifier 142 has negative polarity and therefore no current is flowing through this rectifier.

Upon receipt of a positive step input pulse at 140, current flows through rectifier 141*c* and raises the potential at the anode of rectifier 142 to a positive value and therefore causes current to flow through coil 135, resistor 145, to negative pole 146. Since step input pulses only occur during the spaces between pulses of source 138, the flow of current through coil 135 resets the core so that during the next power pulse period the coil 133 will have high impedance. Hence, the next power pulse from source 138 will raise the potential at the cathode of rectifier 137, thus cutting it off and allowing current from positive pole 130 to produce an output pulse at the output 144. This output pulse flows not only to the output, but also flows rearwardly through the delay line 148, rectifier 141*d*, rectifier 142, coil 135, resistor 145 to negative pole 146. The delay line 148 delays each pulse so that it appears at coil 135 during a space between power pulses and will thus reset the core at that time. Subsequent power pulses from source 138 will have the same effect, namely, they will cut off rectifier 137 and allow current from positive pole 130 to be impressed on the output 144. These pulses will travel through the delay line 148, rectifiers 141*d* and 142, and through the coil 135 to thus reset the core. This state will continue until the second step input pulse is received at 140.

It is noted that when the second step input pulse appears at 140, there will be a large positive potential on the cathode of rectifier 141*b* since one of the pulses passing through the delay line 148 will arrive at the cathode of rectifier 141*b* at the same time that the second step input pulse is impressed on the input 140. Consequently the second step input pulse at 140 will open the upper gate by biasing the cathode of rectifier 141*a* positively. This causes current to flow from positive pole 141*g* through resistor 141*f* and will impress a large positive potential on the anode of rectifier 143. The pulse passing through delay line 148 will flow through rectifier 141*d* and place a positive potential on the anode of rectifier 142. Both ends of reset coil 135 will now be at substantially the same positive potential and no current will flow through this coil. Hence, the core will not be reset during the period of this second signal pulse. Therefore, during the next power pulse from source 138, the coil 133 will have low impedance and will ground the lower end of resistor 131 through rectifier 132. Hence, pulse energy will no longer appear at the output 144.

The third step input pulse at 140 will have the same effect as the first one and the fourth one will have the same effect as the second one. It follows therefore that there will be a continuous train of output pulses at output 144 for every two step input pulses at 140.

Blocking potential generator BP is desirable in order to prevent the drawing of current through resistor 131, rectifier 132 and coil 133 when the core is being reset by the flow of current from positive pole 141*g* through coil 135.

Figure 14A shows the relative waveforms of the power pulse generator 138 and the blocking potential generator BP.

Figure 15 is a schematic diagram of a complementing parallel magnetic amplifier and is similar in many respects to Figure 13. Like parts on Figures 13 and 15 bear similar reference numbers. Instead of providing a single coil 135 as in Figure 13, there is provided in Figure 15 two coils 150 and 154. There is a continuous current through coil 150 flowing from ground through resistors 151 and 152 to the positive pole 153. This tends to continuously revert the core during the spaces between power pulses whereby normally the coil 133 has high impedance during the period of each power pulse from source 138, and therefore current flows to the load 136 during the periods of the power pulses.

Input or control current may be applied at terminal 155 so that current flow through rectifier 156 and coil 154 neutralizes the field established by coil 150. In this event the core will not be reset during the periods between power pulses and coil 133 will have low impedance and will therefore prevent large potential from appearing across the load 136.

Figure 16 is a schematic diagram of a magnetic counter circuit embodying the parallel complementing magnetic amplifier circuit of Figure 15. Similar reference numbers on Figures 15 and 16 represent like parts. Prior to the first step input pulse, the current flowing from positive pole 153 through resistors 151 and 152 and coil 150, will reset the core during the spaces between power pulses. Hence, there will be an output at 169 corresponding to each power pulse from the source 138. These output pulses will be delayed by delay line 162 and will appear during the spaces between power pulses (signal pulse periods) at the cathode of rectifier 161*b*. This will condition the upper gate 161*a*—161*b* so that when the first step input pulse arrives at step input 160, the upper gate will be opened and current will flow from the positive pole 161*g* through resistor 161*f*, rectifier 156 and coil 154. The flux established by this current will neutralize that established by the current flowing through coil 150 and thus prevent resetting of the core 134 during the spaces between power pulses. During the periods of the power pulses, therefore, current from positive pole 130 will be shunted directly to ground through coil 133. Hence, output pulses will cease to occur at 169. The potential on wire 163 will therefore drop during the signal pulse time period and therefore current will flow from positive pole 153, resistor 152, rectifier 164, resistor 141*h* to negative pole 141*j*. Due to the relative values of the potentials of 153 and 141*j* as compared with the values of resistors 152 and 141*h*, the resulting potential at the lower end of coil 150 will be substantially ground, and as a consequence, no resetting current will flow in winding 150, and winding 133 presents a low impedance to current from source 130, and no outputs appear at 169. This state will repeat itself during each successive signal pulse time period until another step input pulse arises at input 160. The next (second) step input pulse at 160 will pass through rectifier 161*c* and will raise the potential on the cathode of rectifier 164 and allow current to again begin to flow from positive pole 153 through coil 150 to ground. This will revert the core during the spaces between power pulses and therefore output pulses will again begin to appear at 169. This operation will continue until another (third) step input pulse arrives, which will have the same effect as the first one. The fourth step input pulse will, of course, have the same effect as the second one.

Rectifier 141*e* of Figure 14 and rectifier 161*e* of Figure 16 have the same function as similar rectifiers such as 91*j* of Figure 9. Resistors 160*a* and source 160*b* of Figure 16 have the same function as resistor 140*a* and negative source 140*b* of Figure 14.

I claim to have invented:

1. In a magnetic counter circuit; a saturable core; means including a source of spaced power pulses for applying a series of pulses of magnetizing force to said core; means determining whether the first-named means will drive the core to saturation; a step input; and means which in response to one step input pulse controls the second-named means so that the core is driven to saturation by each power pulse until another step input pulse appears at which time the second-named means stops the driving of the core to saturation by the first-named means; and means including an output the signal in which depends at any given time on whether the core is being driven to saturation by the first-named means, said third-named means including all of the following: a gate which feeds the second-named means and having two inputs, said step input feeding one input of the gate, and delay means connecting said output to the other input of said gate.

2. In a magnetic counter circuit; first and second gates; a flip-flop circuit including means effecting cut-off at the second gate in one stable state and effecting cut-off at the first gate in the other stable state; said flip-flop circuit including a magnetic amplifier having a saturable core and a source of spaced power pulses for saturating the core except when the core is reset between pulses; means responsive to a current through the first gate to inhibit resetting of the core during the spaces between power pulses and thus place the flip-flop circuit in one of its stable states; means responsive to a current through the second gate to effect resetting of the core between power pulses and thereby flip the flip-flop circuit into another stable state; a step input feeding both of said gates; and output means responsive to whether or not the core is saturated by the power pulses.

3. In a magnetic counter circuit; a flip-flop circuit having a saturable core, a source of spaced power pulses, means for saturating the core depending on whether or not the core was reset during the spaces between pulses including a winding on said core through which said pulses pass, and delay means connected to receive pulses passing through said winding and controlling the resetting of the core thereby to give the flip-flop circuit two stable states; a step input; first and second gates controlled by the step input; the first gate having means for flipping said flip-flop circuit to one of its stable states wherein the core is reset between power pulses; the second gate having means for preventing resetting of the core by said delay means; means for cutting off one of the gates when the flip-flop circuit is in one stable state; and means for cutting off the other gate when the flip-flop circuit is in the other stable state.

4. In a magnetic counter circuit; a flip-flop circuit comprising a magnetic amplifier and a delay element so connected that they may be flipped from first to second stable states and then back to the first stable state; a step input; first and second gates controlled by the step input; and means conditioning the first gate to be operated by a step input pulse when the flip-flop circuit is in its first stable state and blocking the second gate at such time and conditioning the second gate to be operated by a step input pulse when the flip-flop circuit is in its second stable state and blocking the first gate when the flip-flop circuit is in its second stable state; the last-named means including means for flipping the flip-flop circuit to its second stable state when the first gate is operated by a step input pulse and for flipping the flip-flop circuit to its first stable state when the second gate is operated by a step input pulse.

5. In a magnetic counter circuit, a flip-flop circuit comprising a magnetic amplifier having a saturable core with control and power windings thereon and feedback means coupling the power winding to the control winding so that the device will have two stable states, said feedback means having a gate and delay means in its feedback circuit, said delay means having such a time period of delay that the feedback currents will arrive at the control winding in proper time relationship to effect a recycling operation of the magnetic amplifier; a step input; a second gate; means connecting both of said gates to the step input and to the magnetic amplifier so that when a step input pulse is received while the magnetic amplifier is recycling the first gate will open the feedback circuit and stop recycling and when a step input pulse is received while the magnetic amplifier is not recycling the control winding will be energized to trigger the amplifier and produce an output which will flow through the first-named gate and the delay means to thus start a recycling operation.

6. In a magnetic counter circuit; a step input; a first gate controlled by the step input and including a control wire; said first gate producing an output therefrom when pulses appear simultaneously on the step input and the control wire; an inverter for producing an output when there is nothing on its input and for omitting an output when there is a pulse on its input; said step input being connected to the input of said inverter; a second gate controlled by the output of the inverter; the second gate having a control wire and arranged to give an output when said inverter gives an output simultaneously with a pulse on said control wire; a magnetic amplifier that produces an output pulse following each input pulse; said magnetic amplifier comprising a saturable core, a power winding on the core, means for supplying the power winding with spaced power pulses, means for resetting the core during the spaces between power pulses, and a control winding for cancelling the effect of the resetting means; means for energizing the control winding to cancel the effect of the resetting in response to an output from either of said gates; a delay element connecting the output of the power winding to the control wire of said second gate; and an inverter connecting the delayed output of the amplifier to the control wire of the first gate; the last-named inverter producing an output therefrom in the absence of an input thereto and producing no output therefrom in the presence of an input thereto; said delay line, amplifier, inverter and gates being so constructed and arranged that the first step input pulse will flow through the first gate and prevent resetting of the core whereby there will be a large output from the amplifier which will be delayed and caused to actuate the second gate which will produce a current flow which will again prevent resetting of the core, this recycling continuing until the next step input pulse blocks output from the second gate.

7. In a magnetic counter circuit; a step input; a first gate having two inputs for producing an output when the two inputs are simultaneously energized; a first inverter having an input and an output; the step input being connected to one of the inputs of the gate and to the input of the first inverter, a second gate having two inputs, one being connected to the output of the first inverter; the second gate producing an output when its two inputs are simultaneously energized; a magnetic amplifier of the type which emits a power pulse following each control pulse; means for applying control pulses to the magnetic amplifier in response to an output from either gate; inverting and delaying means including an inverter and a delay element in the output of the magnetic amplifier; means feeding the remaining input of the first gate with the output of the inverting and delaying means; a third inverter fed by the output of the inverting and delaying means; and means feeding the remaining input of the second gate with the output of the third inverter; said inverters, gates, amplifier and delay elements being so constructed and arranged that one step input pulse will operate the first gate to apply a control pulse to the amplifier which will produce an output that will be inverted twice and delayed and energize the second gate at the proper time to apply another control pulse to the amplifier and thus effect a recycling that will continue until a second step input pulse will open the second gate.

8. In a magnetic counter circuit; first and second gates each having an input and a control wire and which produce an output in response to simultaneous energizations of the input and the control wire; an inverter in series with the input of the second gate, a step input feeding the input of the first gate and also feeding signals to said inverter which are inverted and fed to the second gate; a delay element fed by the outputs of both said gates; a magnetic amplifier comprising a saturable core with control and power windings thereon, a source of spaced power pulses feeding the powder winding, and means for resetting the core during the spaces between power pulses in the absence of energization of the control winding; an inverter connected between the output of the power winding and the control wire of the first gate; and means connecting the output of the power winding to the control wire of the second gate; said gates, inverters and the amplifier being so constructed and arranged that the first step input pulse passes through the first gate and the delay element to the control winding whereby there will be an output pulse from the amplifier that in the absence of another step input pulse will flow through the second gate to the delay element and to the control winding thereby recycling the system, the next step input pulse actuating the first-named inverter to stop recycling through the second gate.

9. In a magnetic counter circuit, a saturable core having four windings thereon, means for producing a train of spaced positive going power pulses and passing them through the first winding on the core; means for producing a train of pulses which go in a negative direction from a positive datum synchronously with the appearance of the positive going pulses and which are fed through the second winding on the core; a delay element in series with the output of the second winding and which delays the pulses from said output so that they appear during the spaces between pulses, resetting means connected to the third winding for resetting the core during the spaces between power pulses whereby the coils will have high impedance to any power pulse immediately following such resetting, a step input, a first gate conjointly responsive to a step input pulse and to the output of the delay element to cut off the action of the resetting means in response to simultaneous appearance of positive potential at the step input and at the output of the delay element, means for biasing the output of the delay line to a positive potential in the absence of the negative going pulses from the said second winding whereby the first step input pulse may inhibit resetting of the core and effect low impedance of the said first and second windings and substantial outputs from the first and second windings, a second gate controlling current to the fourth winding and which allows current to flow thereto to neutralize the effect of the resetting means when there is no pulse at the step input simultaneously with the presence of a negative going pulse at the output of the delay element, whereby recycling of pulses through the amplifier occurs, the second gate including means whereby the second step input pulse cuts off the second gate and prevents recycling therethrough.

10. In a magnetic counter circuit, a saturable core having a power winding thereon, control winding means on the core, means connected to the power winding for producing a train of spaced power pulses and passing them through the power winding, resetting means for normally resetting the core during the spaces between power pulses, means including a condenser connected to the output of the power winding for normally producing a biasing potential that is reduced in magnitude at a period subsequent to each power pulse that flows through the power winding, said last-named means having the condenser connected to the output of the power winding so as to delay the reduction of the biasing potential so such reductions occur during the spaces between power pulses, a step input, a first gate including means for stopping the resetting of the core by said resetting means and thus reducing the impedance of the power winding when a step input pulse appears at a time that said biasing potential is not reduced, and a second gate including means which in the presence of the reduced biasing potential concurrently with the absence of a step input pulse controls the control winding means to inhibit the effect of the resetting means and which stops recycling therethrough in response to a second step input pulse.

11. In a magnetic counter circuit, a saturable core having a power winding thereon, a source of spaced power pulses connected to said winding, resetting means cooperating with the core to normally reset the same during the spaces between power pulses so that a power pulse immediately following a resetting finds the coil having high impedance, a step input, a first gate including means which in response to a step input pulse inhibits the resetting of the core by the resetting means when the core is not being saturated, means including a second gate for inhibiting resetting of the core when the same is not being saturated by the power pulses at a time when there is no step input pulse, the last-named means including means to stop the inhibiting of the resetting means in response to a second step input.

12. In a magnetic counter circuit as defined in claim 11, in which the resetting means includes a delay element and the last-named means includes another delay element both arranged so that step input pulses may occur simultaneously with power pulses and still effect operation of the device.

13. In a magnetic counter circuit, first and second magnetic amplifiers, two sources of spaced power pulses respectively feeding the two magnetic amplifiers, the pulses of each source occurring in the spaces between pulses of the other source, means interconnecting the outputs and inputs of said amplifiers to form a flip-flop circuit, a step input, and means including first and second gates which are connected to the step input and to the last-named means so that odd numbered step input pulses flow through the first gate and flip the circuit to one stable state and even numbered step input pulses flow through the second gate and flip the circuit to the other stable state.

14. A magnetic counter circuit as defined in claim 13 in which each of the magnetic amplifiers have a power winding for receiving the power pulses and delivering them to the output of that amplifier when the core was not reset during the spaces between power pulses.

15. A magnetic counter circuit as defined in claim 13 in which the magnetic amplifiers have primary windings energized by their respective trains of power pulses, input windings for resetting the cores, and secondary output windings into which currents are induced by the primary windings when the cores are reset during spaces between pulses by the input windings.

16. In a magnetic counter circuit; a flip-flop circuit including a magnetic amplifier which produces an output during a time interval following an input pulse, said amplifier having a source of spaced power pulses feeding the same, and feedback means for supplying an input pulse to the amplifier in response to each output pulse therefrom, said feedback means including a delay element for delaying the output pulse so that when it arrives at the amplifier input it will occur during the spaces between power pulses; a step input; and means including first and second gates connected to said step input and to said flip-flop circuit so the first step input pulse will pass through the first gate and flip the circuit to one stable state and another step input will pass through the second gate and flip the flip-flop circuit to another stable state, the last-named means including a long delay element connecting the flip-flop circuit to the second gate so the latter will not respond to admit step input pulses until a predetermined time period has elapsed following the first step input pulse.

17. A magnetic counter circuit as defined in claim 16 in which the last-named means includes an inverter between the output of the long delay element and the first gate, said feedback means having a gate therein, said last-named means having an inverter connecting the output of the second gate and the third gate.

18. A magnetic counter circuit as defined in claim 16 in which the last-named means includes a first inverter connecting the step input to the second gate and a second inverter connecting the second gate to the output of the long delay element, said feedback path having an inverter for inverting signals fed to the long delay element and another inverter that does not feed the long delay element, said feedback path having a gate which produces an output that energizes the amplifier input when outputs concurrently exist on the second gate and the last-named inverter.

19. In a magnetic counter circuit, a step input, a parallel-type complementing magnetic amplifier fed by spaced power pulses and having an input and an output, said amplifier having means for producing output pulses simultaneously with the power pulses in the absence of signal pulses at the amplifier input during the spaces between power pulses, delay means connected to said output for delaying pulses occurring at the output for a sufficient time that they occur during the spaces between power pulses, and gating means fed by the step input as well as by the delayed pulses for controlling the amplifier input to produce a single train of output pulses for each two step input pulses.

20. In a magnetic counter circuit, a step input, a parallel-type complementing magnetic amplifier having an input and an output, gating means connected to the step input and to the amplifier input, and delay means connecting said output to said gating means, said gating means including means whereby sequential application of step input signals at said step input alternately produces and terminates a train of output pulses at said output.

21. In a magnetic counter circuit, a step input, a parallel-type non-complementing magnetic amplifier fed by spaced power pulses and having an input and an output, said amplifier having means for producing output pulses simultaneously with the power pulses when there are signal pulses at the amplifier input during the spaces between power pulses, delay means connected to said output for delaying pulses occurring at the output for a sufficient time that they occur during the spaces between power pulses, and gating means fed by the step input as well as by the delayed pulses for controlling the amplifier input to produce a single train of output pulses for each two step input pulses.

22. In a magnetic counter circuit, a step input, a parallel-type non-complementing magnetic amplifier having an input and an output, gating means connected to the step input and to the amplifier input, and delay means connecting said output to said gating means, said gating means including means whereby sequential application of input signals at said step input alternately produces and terminates a train of output pulses at said output.

23. In a magnetic counter circuit, a step input, a series-type complementing magnetic amplifier fed by spaced power pulses and having an input and an output, said amplifier having means for producing output pulses simultaneously with the power pulses in the absence of signal pulses at the amplifier input during the spaces between power pulses, delay means connected to said output for delaying pulses occurring at the output for a sufficient time that they occur during the spaces between power pulses, and gating means fed by the step input as well as by the delayed pulses for controlling the amplifier input to produce a single train of output pulses for each two step input pulses.

24. In a magnetic counter circuit, a step input, a series-type non-complementing magnetic amplifier fed by spaced power pulses and having an input and an output, said amplifier having means for producing output pulses simultaneously with the power pulses when there are signal pulses at the amplifier input during the spaces between power pulses, delay means connected to said output for delaying pulses occurring at the output for a sufficient time that they occur during the spaces between power pulses, and gating means fed by the step input as well as by the delayed pulses for controlling the amplifier input to produce a single train of output pulses for each two step input pulses.

25. A magnetic binary counter comprising a flip-flop circuit having two stable positions, said flip-flop circuit including a magnetic core with two corresponding stable positions and with an operating characteristic in which there is an unstable condition in transition between said two stable positions, an impedance within said flip-flop circuit, means coupled to said core to produce a voltage drop across said impedance which is either a high voltage or a low voltage in accordance with the resident stable state of said flip-flop circuit, said magnetic core having a first input winding and a second input winding, means to produce input pulses at a single input terminal, an asymmetrical means, a biasing means, a circuit connecting said asymmetrical means and said biasing means between said first input winding and said single input terminal, an alternative circuit connected between said second input winding and said single input terminal, said biasing means and the voltage drop across said impedance cooperating to produce a potential drop across said asymmetrical means so that the said asymmetrical means is conductive in response to said pulses only when a particular one of said high or low voltages is present across said impedance.

26. A binary counter comprising in combination, a bistable state magnetic core, a trigger pulse source for changing the storage state of said core, a circuit for coupling said source to the core in two polarities to select either storage state, a gating circuit responsive to the resident storage state of said core connected to inhibit one polarity of said trigger pulse source to thereby cause the core to attain alternate storage states in response to successive input trigger pulses from said source.

27. A binary counter comprising in combination, a bistable state magnetic core, two windings linked to said core, a trigger pulse source for changing the storage state of said core, a circuit for coupling said source to said windings to produce drives on said core of two polarities to select either storage state of said core, a gating circuit responsive to signals derived in accordance with the resident storage state of said core and connected to inhibit one polarity of said trigger pulse source to thereby cause the core to attain alternate storage states in response to successive input trigger pulses from said source.

28. A binary counter comprising in combination, a bistable state magnetic core, a trigger pulse source for changing the storage state of said core, a circuit for coupling said source to the core to be effective in two magnetic polarities to select either storage state, a gating circuit responsive to signals derived in accordance with the resident storage state of said core and connected to inhibit the magnetic effect in one polarity of said trigger pulse source to thereby cause the core to attain alternate storage states in response to successive input trigger pulses from said source.

29. A binary counter comprising, in combination, means for supplying input signals to be counted, a bistable state magnetic core, a plurality of control windings linked to said core for determining the state of said core, means for deriving signals from said core in accordance with the state thereof, means responsive to said derived signals for controlling the energization of one of said control windings, means responsive to said input signals for controlling the energization of another of said control windings, the senses of linkage and the energizations of said control windings being such as to produce equal and opposite magnetizing forces on said core, so that said core assumes one of the bistable states when one of said control windings is energized and the other thereof when both of said control windings are energized.

30. A binary counter comprising, in combination, means for supplying input pulses to be counted, a bistable state magnetic core, a plurality of control windings linked to said core for determining the state of said core, an output winding for deriving pulses when said core is in one of the bistable states, means responsive to said derived pulses for controlling the application of energizing current to one of said control windings, means responsive to said input pulses for controlling the application of energizing current to another of said control windings, the senses of linkage and the magnitude of said energizing current applied to said control windings being such as to produce equal and opposite magnetizing forces on said core to inhibit a change of state of said core when both of said control windings are energized and to produce a change of state when only one of said control windings is energized.

31. A binary counter comprising a source of input pulses to be counted, a first complementing magnetic amplifier means for producing no output pulse when placed in a first state in response to a pulse at its input and for producing an output pulse when in a second state as a result of no pulse at its input, gate means, means for supplying pulses to said gate means in accordance with pulses from said source and in accordance with the state of said first complementing means, second complementing magnetic amplifier means for receiving pulses from said gate means and for supplying pulses to said first complementing amplifier means when the latter is in said first state and an input pulse to be counted is not supplied and when the latter is in said second state and an input pulse to be counted is supplied, said second complementing means being arranged for not supplying pulses to said first complementing amplifier means when the latter is in said first state and an input pulse to be counted is supplied and when the latter is in said second state and an input pulse to be counted is not supplied.

References Cited in the file of this patent

UNITED STATES PATENTS

| | | |
|---|---|---|
| 2,654,080 | Browne | Sept. 29, 1953 |
| 2,680,819 | Booth | June 8, 1954 |
| 2,709,225 | Pressman | May 24, 1955 |